(12) United States Patent
Johnson et al.

(10) Patent No.: US 8,972,295 B2
(45) Date of Patent: Mar. 3, 2015

(54) DYNAMIC VISUAL STATISTICAL DATA DISPLAY AND METHOD FOR LIMITED DISPLAY DEVICE

(75) Inventors: Jennifer Ellen Johnson, New York, NY (US); John Keoni Morris, Bainbridge Island, WA (US); Stephen Carl de Brun, Los Angeles, CA (US); Nicholas Langdon Gunther, STamford, CT (US)

(73) Assignee: Visible Market, Inc., New York, NY (US)

( * ) Notice: Subject to any disclaimer, the term of this patent is extended or adjusted under 35 U.S.C. 154(b) by 0 days.

(21) Appl. No.: 13/478,949

(22) Filed: May 23, 2012

(65) Prior Publication Data

US 2012/0303548 A1 Nov. 29, 2012

Related U.S. Application Data

(60) Provisional application No. 61/489,166, filed on May 23, 2011.

(51) Int. Cl.

| | | |
|---|---|---|
| *G06Q 40/00* | (2012.01) | |
| *G09G 5/00* | (2006.01) | |
| *G06F 7/00* | (2006.01) | |
| *G06F 17/00* | (2006.01) | |
| *G06F 3/048* | (2013.01) | |
| *G06Q 40/04* | (2012.01) | |

(52) U.S. Cl.
CPC .............. *G06Q 40/04* (2013.01); *G06F 17/00* (2013.01); *G06F 7/00* (2013.01); *G06Q 40/00* (2013.01); *G09G 5/00* (2013.01); *G06F 3/048* (2013.01)
USPC ............. 705/36 R; 705/35; 705/37; 345/619; 707/803; 707/E17.005; 707/E17.044; 715/810

(58) Field of Classification Search
None
See application file for complete search history.

(56) References Cited

U.S. PATENT DOCUMENTS

| | | | | |
|---|---|---|---|---|
| 5,220,500 | A * | 6/1993 | Baird et al. | 705/36 R |
| 5,875,305 | A * | 2/1999 | Winter et al. | 709/231 |
| 5,884,042 | A * | 3/1999 | Winter et al. | 709/231 |

(Continued)

OTHER PUBLICATIONS

Wattenberg, Martin, Visualizing the Stock Market, Late-Breaking Results, May 15-20, 1999, pp. 188-189, CHI 99, New York.

(Continued)

*Primary Examiner* — Gregory Johnson
(74) *Attorney, Agent, or Firm* — Andrews Kurth LLP; Aldo Noto

(57) ABSTRACT

Embodiments include methods for distributing visual display information related to a plurality of items to one or more display devices, and methods for rendering visual display information related to a plurality of items by a display device. Embodiments also comprise display devices, servers, and computer-readable media embodying one or more of these methods. Embodiments display of large data sets and associated statistics, such as trading activity of securities or other business statistics, on devices with limited-size display screen, e.g. smartphone or tablet. Embodiments enable visual navigation of large dynamic data sets via relative and absolute contextual statistics. Embodiments combine dynamic visual displays with a multi-tiered navigation structure, supporting more effective information gathering and processing across a variety of users with different objectives. Embodiments provide more relevant, individualized user experience through flexibility to observe patterns, correlation, and contextuality, and to explore subsections of the data quickly via unique navigation paths.

25 Claims, 22 Drawing Sheets

(56) References Cited

U.S. PATENT DOCUMENTS

| | | | | |
|---|---|---|---|---|
| 5,974,413 A * | 10/1999 | Beauregard et al. | | 1/1 |
| 6,429,868 B1 * | 8/2002 | Dehner et al. | | 345/440 |
| 6,583,794 B1 | 6/2003 | Wattenberg | | |
| 6,636,803 B1 * | 10/2003 | Hartz et al. | | 701/459 |
| RE39,090 E | 5/2006 | Beauregard et al. | | 1/1 |
| 7,343,302 B2 * | 3/2008 | Aratow et al. | | 705/325 |
| 7,461,023 B1 * | 12/2008 | Helweg | | 705/37 |
| 7,664,695 B2 * | 2/2010 | Cutler | | 705/37 |
| 7,734,529 B1 * | 6/2010 | Zhou | | 705/37 |
| 7,985,134 B2 * | 7/2011 | Ellis | | 463/25 |
| 8,078,545 B1 * | 12/2011 | Zilka et al. | | 705/310 |
| 8,219,558 B1 * | 7/2012 | Trandal et al. | | 707/736 |
| 8,458,084 B2 * | 6/2013 | Yakubov | | 705/38 |
| 8,458,085 B1 * | 6/2013 | Yakubov | | 705/38 |
| 2001/0049721 A1 * | 12/2001 | Blair et al. | | 709/203 |
| 2002/0067376 A1 * | 6/2002 | Martin et al. | | 345/810 |
| 2002/0138386 A1 * | 9/2002 | Maggioncalda et al. | | 705/36 |
| 2002/0152288 A1 * | 10/2002 | Hora et al. | | 709/219 |
| 2003/0011646 A1 * | 1/2003 | Levine et al. | | 345/848 |
| 2003/0069834 A1 * | 4/2003 | Cutler | | 705/37 |
| 2003/0103088 A1 * | 6/2003 | Dresti et al. | | 345/835 |
| 2003/0115602 A1 * | 6/2003 | Knee et al. | | 725/61 |
| 2003/0137536 A1 * | 7/2003 | Hugh | | 345/744 |
| 2003/0187874 A1 * | 10/2003 | Peschel et al. | | 707/104.1 |
| 2003/0227487 A1 * | 12/2003 | Hugh | | 345/777 |
| 2004/0002892 A1 * | 1/2004 | Gluck et al. | | 705/10 |
| 2004/0186673 A1 * | 9/2004 | Agoston et al. | | 702/70 |
| 2004/0193524 A1 * | 9/2004 | Almeida et al. | | 705/36 |
| 2004/0235542 A1 * | 11/2004 | Stronach et al. | | 463/6 |
| 2005/0027613 A1 * | 2/2005 | Takekuma et al. | | 705/26 |
| 2005/0039142 A1 * | 2/2005 | Jalon et al. | | 715/823 |
| 2005/0075965 A1 * | 4/2005 | Cutler | | 705/37 |
| 2005/0086612 A1 * | 4/2005 | Gettman et al. | | 715/848 |
| 2005/0131924 A1 * | 6/2005 | Jones | | 707/100 |
| 2005/0149428 A1 * | 7/2005 | Gooch et al. | | 705/37 |
| 2005/0154796 A1 * | 7/2005 | Forsyth | | 710/1 |
| 2005/0223264 A1 * | 10/2005 | Arden et al. | | 714/4 |
| 2005/0228735 A1 * | 10/2005 | Duquette | | 705/37 |
| 2006/0020538 A1 * | 1/2006 | Ram et al. | | 705/37 |
| 2006/0061547 A1 * | 3/2006 | Bramwell et al. | | 345/156 |
| 2006/0069635 A1 * | 3/2006 | Ram et al. | | 705/37 |
| 2006/0075934 A1 * | 4/2006 | Ram | | 108/44 |
| 2006/0161865 A1 * | 7/2006 | Scott et al. | | 715/810 |
| 2006/0240778 A1 * | 10/2006 | Yuki et al. | | 455/41.2 |
| 2006/0271526 A1 * | 11/2006 | Charnock et al. | | 707/3 |
| 2006/0271867 A1 * | 11/2006 | Wang et al. | | 715/764 |
| 2007/0028174 A1 * | 2/2007 | Moore et al. | | 715/733 |
| 2007/0028175 A1 * | 2/2007 | Moore et al. | | 715/733 |
| 2007/0078531 A1 * | 4/2007 | Adra | | 700/31 |
| 2007/0156565 A1 * | 7/2007 | Singer et al. | | 705/37 |
| 2007/0196007 A1 * | 8/2007 | Chen et al. | | 382/131 |
| 2007/0226645 A1 * | 9/2007 | Kongqiao et al. | | 715/781 |
| 2007/0250432 A1 * | 10/2007 | Olof-Ors et al. | | 705/37 |
| 2007/0277100 A1 * | 11/2007 | Sheha et al. | | 715/531 |
| 2008/0004035 A1 * | 1/2008 | Atkins et al. | | 455/454 |
| 2008/0027975 A1 * | 1/2008 | Evans et al. | | 707/102 |
| 2008/0052945 A1 * | 3/2008 | Matas et al. | | 34/173 |
| 2008/0062318 A1 * | 3/2008 | Ellis et al. | | 348/564 |
| 2008/0064490 A1 * | 3/2008 | Ellis | | 463/25 |
| 2008/0065507 A1 * | 3/2008 | Morrison et al. | | 705/26 |
| 2008/0066111 A1 * | 3/2008 | Ellis et al. | | 725/57 |
| 2008/0077956 A1 * | 3/2008 | Morrison et al. | | 725/38 |
| 2008/0098464 A1 * | 4/2008 | Mizrah | | 726/5 |
| 2008/0133336 A1 * | 6/2008 | Altman et al. | | 705/10 |
| 2008/0133506 A1 * | 6/2008 | Evans et al. | | 707/5 |
| 2008/0177594 A1 * | 7/2008 | Lamoureux et al. | | 705/7 |
| 2008/0177858 A1 * | 7/2008 | Aarnio et al. | | 709/217 |
| 2008/0215477 A1 * | 9/2008 | Annunziata | | 705/37 |
| 2008/0263015 A1 * | 10/2008 | Qiu et al. | | 707/3 |
| 2008/0270383 A1 * | 10/2008 | Allen et al. | | 707/5 |
| 2009/0012803 A1 * | 1/2009 | Bishop et al. | | 705/1 |
| 2009/0177543 A1 * | 7/2009 | Ram et al. | | 705/14 |
| 2009/0216435 A1 * | 8/2009 | Zheng et al. | | 701/209 |
| 2009/0240586 A1 * | 9/2009 | Ramer et al. | | 705/14 |
| 2009/0254572 A1 * | 10/2009 | Redlich et al. | | 707/10 |
| 2009/0254778 A1 * | 10/2009 | Huang et al. | | 714/38 |
| 2009/0265628 A1 * | 10/2009 | Bamford et al. | | 715/702 |
| 2009/0271702 A1 * | 10/2009 | Bamford et al. | | 715/702 |
| 2009/0282369 A1 * | 11/2009 | Jones | | 715/848 |
| 2009/0298418 A1 * | 12/2009 | Michael et al. | | 455/3.04 |
| 2010/0046842 A1 * | 2/2010 | Conwell | | 382/218 |
| 2010/0070448 A1 * | 3/2010 | Omoigui | | 706/47 |
| 2010/0082491 A1 * | 4/2010 | Rosenblatt et al. | | 705/65 |
| 2010/0169206 A1 * | 7/2010 | Singer et al. | | 705/37 |
| 2010/0205179 A1 * | 8/2010 | Carson et al. | | 707/740 |
| 2010/0214216 A1 * | 8/2010 | Nasiri et al. | | 345/158 |
| 2010/0262901 A1 * | 10/2010 | DiSalvo | | 715/227 |
| 2010/0313169 A1 * | 12/2010 | Huang et al. | | 715/835 |
| 2010/0315359 A1 * | 12/2010 | Seong et al. | | 345/173 |
| 2011/0087581 A1 * | 4/2011 | Ram et al. | | 705/37 |
| 2011/0093373 A1 * | 4/2011 | Monroe et al. | | 705/35 |
| 2011/0112952 A1 * | 5/2011 | Annunziata et al. | | 705/37 |
| 2011/0138327 A1 * | 6/2011 | Scott et al. | | 715/810 |
| 2011/0163955 A1 * | 7/2011 | Nasiri et al. | | 345/158 |
| 2011/0302105 A1 * | 12/2011 | Yakubov | | 705/36 R |
| 2012/0005617 A1 * | 1/2012 | Lee et al. | | 715/776 |
| 2012/0030089 A1 * | 2/2012 | Ram et al. | | 705/37 |
| 2012/0032979 A1 * | 2/2012 | Blow et al. | | 345/647 |
| 2012/0069131 A1 * | 3/2012 | Abelow | | 348/14.01 |
| 2012/0084292 A1 * | 4/2012 | Liang et al. | | 707/741 |
| 2012/0150446 A1 * | 6/2012 | Chang et al. | | 702/3 |
| 2012/0191716 A1 * | 7/2012 | Omoigui | | 707/740 |
| 2012/0240236 A1 * | 9/2012 | Wyatt et al. | | 726/25 |
| 2012/0242688 A1 * | 9/2012 | Boyle | | 345/629 |
| 2012/0246060 A1 * | 9/2012 | Conyack et al. | | 705/38 |
| 2012/0252577 A1 * | 10/2012 | Webster | | 463/31 |
| 2012/0260158 A1 * | 10/2012 | Steelberg | | 715/234 |
| 2012/0271748 A1 * | 10/2012 | DiSalvo | | 705/37 |
| 2012/0289147 A1 * | 11/2012 | Raleigh et al. | | 455/3.06 |
| 2012/0290336 A1 * | 11/2012 | Rosenblatt et al. | | 705/5 |
| 2012/0303548 A1 * | 11/2012 | Johnson et al. | | 705/36 R |
| 2012/0311496 A1 * | 12/2012 | Cao et al. | | 715/821 |
| 2012/0323704 A1 * | 12/2012 | Steelberg et al. | | 705/14.73 |
| 2013/0013676 A1 * | 1/2013 | Blair et al. | | 709/203 |
| 2013/0030979 A1 * | 1/2013 | Annunziata et al. | | 705/37 |
| 2013/0080467 A1 * | 3/2013 | Carson et al. | | 707/769 |
| 2013/0159892 A1 * | 6/2013 | Suraj et al. | | 715/762 |
| 2013/0198196 A1 * | 8/2013 | Myslinski | | 707/740 |

OTHER PUBLICATIONS

Wilkinson, Leland and Friendly, Michael, The History of the Cluster Heat Map, The American Statistician, Nov. 18, 2008, pp. 1-11.

Smart Money web tool, http://www.marketwatch.com/tools/stockresearch/marketmap, as it existed in 2010.

* cited by examiner

FIG. 14

DYNAMIC VISUAL STATISTICAL DATA DISPLAY AND METHOD FOR LIMITED DISPLAY DEVICE

CROSS-REFERENCE TO RELATED APPLICATIONS

This application claims the priority of U.S. Provisional Application Ser. No. 61/489,166, entitled "Dynamic Visual Market Data Display And Navigation System And Method For Limited Display Device," which was filed May 23, 2011 and is incorporated herein by reference.

FIELD OF TECHNOLOGY

Embodiments described herein relate to the transmission and visual display of large data sets and their associated statistics, such as the trading activity of securities on a securities exchange or other business measurement statistics, on a limited display screen, such as a smartphone or mobile tablet. More specifically, embodiments include systems and methods for the transmission, display and visual navigation of a large dynamic data set via multi-faceted display of relative and absolute contextual statistics, such systems and methods which combine dynamic simultaneously-updating comparative visual displays with a multi-tiered navigation structure, together which support more effective information gathering and processing across a variety of users with different objectives.

BACKGROUND

A key goal of investors, traders, journalists, and others who are in some way connected with securities markets or other markets is to determine market performance overall, and how it effects themselves and others. This inquiry is complicated by the fact that, on a given day, the market as a whole may be up, a particular market sector (e.g., technology stocks) may be down, but a particular stock within that sector (e.g., Google) may be up. One conventional approach of objectively summarizing and benchmarking market performance with one or two indices (e.g., Dow Jones Industrial Average (DJIA)) obfuscates much of the detail needed by the market participants and observers. On the other extreme, another conventional presentation of market information is a list of stock prices such as what is found in a daily newspaper. The drawback, however, is the difficulty in collectively presenting a large amount of individual current statistics for items while summarizing the overall dynamic state of the information in a way that allows the user to interact with the data quickly at the individual, grouped and summary levels. Another approach employs a conventional heat map, which is a type of graphical representation of data where the individual values in a matrix are represented as colors. However, it is difficult to dynamically represent the multi-faceted relationships, sub-relationships, and pertinent data of individual items, related items and the information or market in aggregate using a conventional heat map.

A further drawback is each individual's information requirements and assessments are different, so an objective statistical data or market performance summary system limits a user's ability to make assessments and spot trends which are subjective and pertain to that individual's perspective vis-à-vis the information. One conventional approach to satisfying an individual's subjective information queries is through individual queries, such as quote searches and user-defined security watch lists. A drawback of individual queries and persistent query lists is that they limit a user's ability to compare and understand information in context with the overall data set or market.

One attempt to bridge the objective market performance gap was made by Martin Wattenberg of *SmartMoney* magazine. In his paper, *Visualizing the Stock Market*, Wattenberg described a two-dimensional data visualization algorithm capable of presenting detailed information on hundreds of items while emphasizing overall patterns in the data. This display method, which builds on Shneiderman's treemap technique, makes use of both hierarchy and similarity information. The display groups companies into rectangular-shaped sectors, with individual companies displayed as rectangles having an area proportional to market capitalization and dimensions optimized to be as close as possible to square. Each rectangle is filled with a color indicating the percent change of the stock's price since the most recent market close, with green indicating positive change, red indicating negative change, and black indicating lack of change. Within a sector, companies (rectangles) are ordered such that neighboring stocks are as similar as possible. In Wattenberg's model, similarity is derived from the percent price changes for each month of the past three years, which is represented by a point in 36-dimensional space. Within each sector, the layout chosen is the one that minimizes the sum of the distances between all pairs of adjacent rectangles. More details are provided in U.S. Pat. No. 6,583,794. Wattenberg implemented this approach in the *Map of the Market*, a web-based tool that reports current data on 1000 publicly traded companies. *Map of the Market* is available at http://www.smartmoney.com/map-of-the-market.

While Wattenberg's *Map of the Market* addressed some of the inadequacy of earlier solutions, several drawbacks remain. First, the *Map of the Market* display is static and does not update automatically and dynamically. The user must update the display manually, which may take a substantial amount of time, thereby reducing the interactivity and utility of the application. Second, since *Map of the Market* is a web-based solution that is intended for display in a fixed window size of an Internet browser (e.g., Internet Explorer by Microsoft), the chosen way of sizing the rectangles representing individual stocks (i.e., by capitalization) means that certain stock tiles are less visible than others. In fact, the majority of the tiles are so small they are unable to include text or other discernible labeling or other information. This methodology occludes much of the activity data for a number of stocks contained in the set, and thereby makes it impossible for users to see or understand performance of those stocks which do not have sufficient market capitalization to be fully visible to users. Therefore the methodology's utility in displaying performance context is reduced to a data set of solely the largest cap stocks in sectors rather than a wider array. Third, the use of the fixed-size browser window for displaying *Map of the Market* restricts its usefulness and also makes it incompatible with newer user-interface technologies, e.g., touch screens, that allow the user to navigate more easily among large amounts of data or information. What is needed, then, is a method for visualizing a large collection of financial or other statistical information that overcomes these and other drawbacks of the prior art methods.

BRIEF DESCRIPTION OF THE DRAWINGS

FIG. 14 is a view of a display in an embodiment, showing the results of a search.

DETAILED DESCRIPTION

Figure 1:
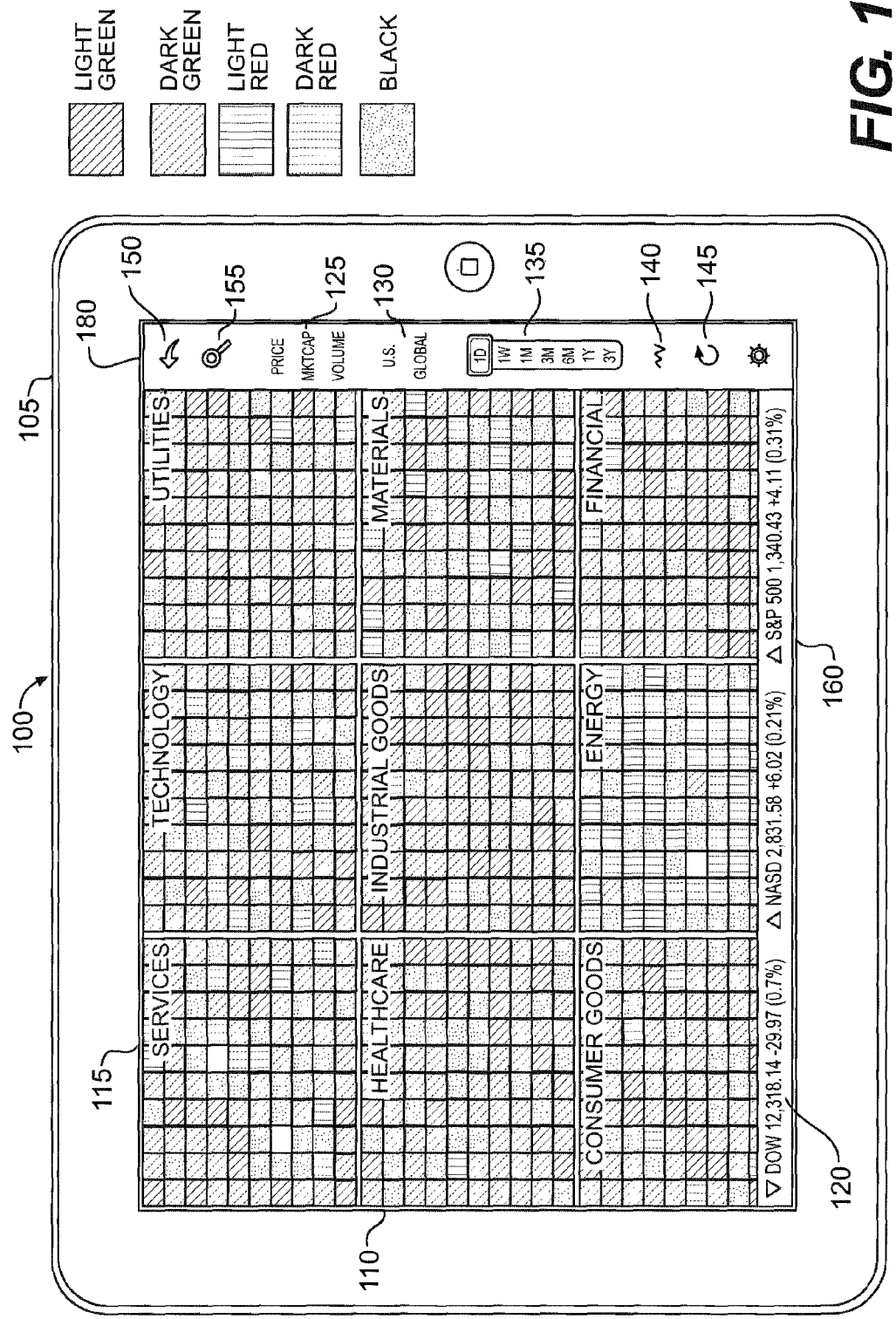
FIG. 1 is a view of a display in an embodiment of the present disclosure, showing price changes.

One aspect of the systems and methods described herein is providing a dynamic updating visual display of financial market data to a user. The system may include visual display software application that executes on portable or stationary computer (e.g., Mac, PC, etc.), a mobile phone or smartphone (e.g., iPhone or Android-based device), a personal digital assistant, or a tablet device (e.g., iPad). Based on various types of data, the application provides a variety of different displays for a wide range of statistical data including a variety of statistical performance data in a manner that allows the user to quickly identify relationships and trends. Examples of these displays are shown in FIGS. 1 through 14 and are described in more detail below. Although these examples are provided in the context of an iPad, embodiments of the system and method may utilize other computing platforms as noted above. Also, while the examples shown relate to displaying market data relating to stocks, or financial data such as financial risk, data relating to any statistics for any data set (an array) may be visualized using the embodiments shown or modifications. A non-exhaustive list of exemplary market units include stocks, bonds, futures contracts, mutual funds, exchange traded funds, diamonds and other precious minerals, commodities, and commodity futures contracts. More generally, embodiments can be used to advantage to monitor variations in dynamic data for components of any large data set.

Moreover, embodiments provide users a multiple-tiered interface which intertwines the dynamic visualization together with its navigation, allowing users to expand the view from an overview screen into sub-hierarchies and further navigate to individual items or data elements, and then smoothly return to the full visualization. Embodiments make use of 30-frames-per-second animation sequences to create a fluid and smooth navigation experience. The visualization interface has flexible modes and preferences, providing users the ability to visually detect and observe patterns, correlation, contextuality, and outliers, and to explore sub-sections of the data quickly via their own unique navigation path, providing each user with a more subjective and relevant experience.

Embodiments also create an integrated user experience, which makes its use more natural and intuitive. The user experience synthesizes color, animation, ontology, and sound effects to create a metaphor of vertically navigating the interface from the top level through sub-hierarchies into individual data pages. For example if the visualization screen is set to compare current price movements, the rendering becomes a matrix where background color intensity matches the degree of an items price movement. The background colors remain consistent as the user navigates the heat map section of the display, so navigation appears to expand the element, exposing light details for contextuality within the element at the highest level and deeper details and charts at the lower levels. This allows a small display device such as an iPad or iPhone to display an interface that appears beautiful and easy to understand, yet provides access to larger, more complex, less intuitive sets of underlying data without breaking the user's thought. In some embodiments, a user can select a region by touch-gesture, a sound is played and an animated sequence automatically expands the region such that the portion of the visualization that represents sub-hierarchy fills the screen. In such embodiments, colors, borders and fonts of the starting and ending points of the navigation are maintained and blended, creating a game-like experience where the user's navigation feels fluid and natural, as it is metaphorically similar to diving in and out of the hierarchy of the data set.

FIG. 1 is a screenshot showing one example of how the application according to one or more embodiments displays market-wide information about trends in stock price, in the form of an activity map, based on the user selection of "Price" in the vertical menu bar on the right side of the screen. The "market" is displayed as a nine-sector grid, in which each sector contains 100 stocks. Persons of ordinary skill will recognize that these numbers are merely exemplary, and embodiments are not limited by the number of sectors displayed or the number of stocks (or other items) displayed in each sector or group.

Each of the 900 stocks shown in the grid of FIG. 1 is assigned a color based on the percentage difference and/or correlated percentage difference between its current price and the stock price at an earlier reference point. The reference point may be user-selectable, such as by the slider shown on the right side of the display in FIG. 1. In this example, the user may select one of several different reference points, ranging from yesterday ("1D") to five years ago ("5Y"). In an embodiment, there are seven predetermined reference points, including 1D (yesterday), 1W (one week), 1M (one month), 3M (three months), 6M (six months), 1Y (one year), 5Y (five years). However, persons of ordinary skill will recognize that these temporal reference points are merely exemplary, and embodiments are not limited by the number or value of the reference points.

FIG. 1 shows an exemplary activity map 100. The map is displayed on the display screen 160 of tablet computer 105. An exemplary tablet computer is an iPad®. (iPad is a registered trademark of Apple, Inc.) Displayed on display screen 160 are a market display screen 110, option menu 180, and optional market index display 120. Market display screen 110 includes nine display regions 115 in a square pattern. Each display region corresponds to a specific sector and displays the name of the sector. For example, display region 115 shows icons for stocks in the Services sector. The display region for each sector shows 100 icons arranged in a 10×10 matrix. Although not illustrated in FIG. 1, in embodiments, each icon displayed in market display screen 110 also displays the stock symbol and a number (for example, a price or percentage). The option menu 180 includes back navigation icon 150, search icon 155, slider 135 for selecting one of seven time periods of interest, arrangement icon 140, which allows the user to customize the arrangement of icons in a specific sector, and a manual refresh icon 145. Also available, although not illustrated in FIG. 1, are icons for information and for favorites. At 125 the user can select price, market capitalization, and volume as the comparison data type of interest, and at 130 the user can select the display of United States or Global stocks.

Figure 2:
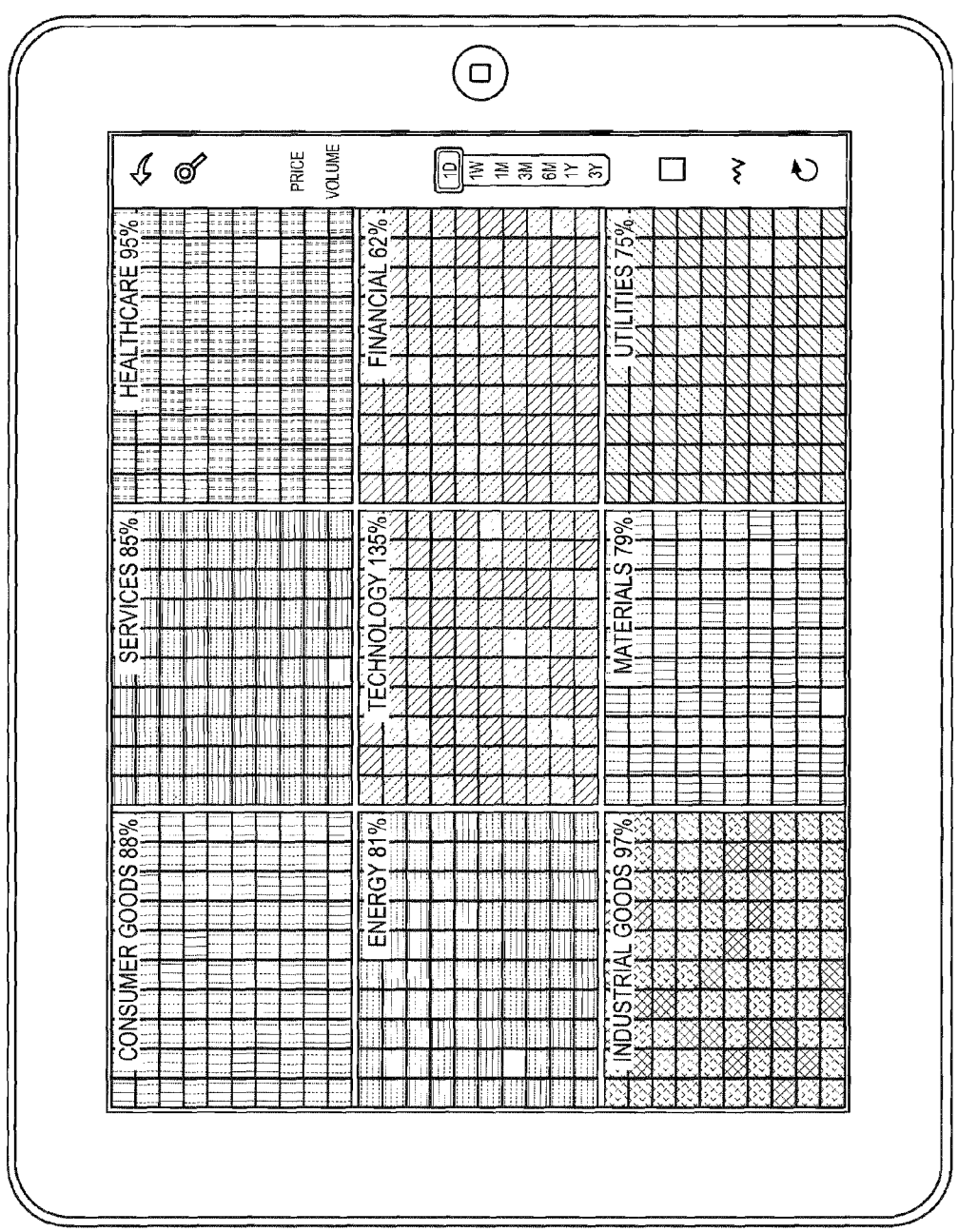
FIG. 2 is a view of a display in an embodiment of the present disclosure, showing trading volume.

As shown in FIG. 2, the application also may display the statistics for market trading volume for each of the 900 stocks shown in the grid. The user may select this display from among other possible displays by choosing "Volume" in the vertical menu bar on the right side of the screen. In the same manner as discussed above with reference to FIG. 1, the user may select the period of interest (i.e., "1D" to "5Y") for the market statistic volume display. In "Volume" mode, the application sorts the stocks into volume buckets and assigns a color to each bucket prior to rendering the display. As shown in FIG. 2, each sector may use a different base color (e.g., green for "Technology," red for "Materials") with darker shades of the base color indicating lower volumes and lighter shades indicating higher volumes. The base colors and degree of shading may be user selectable.

Figure 3:
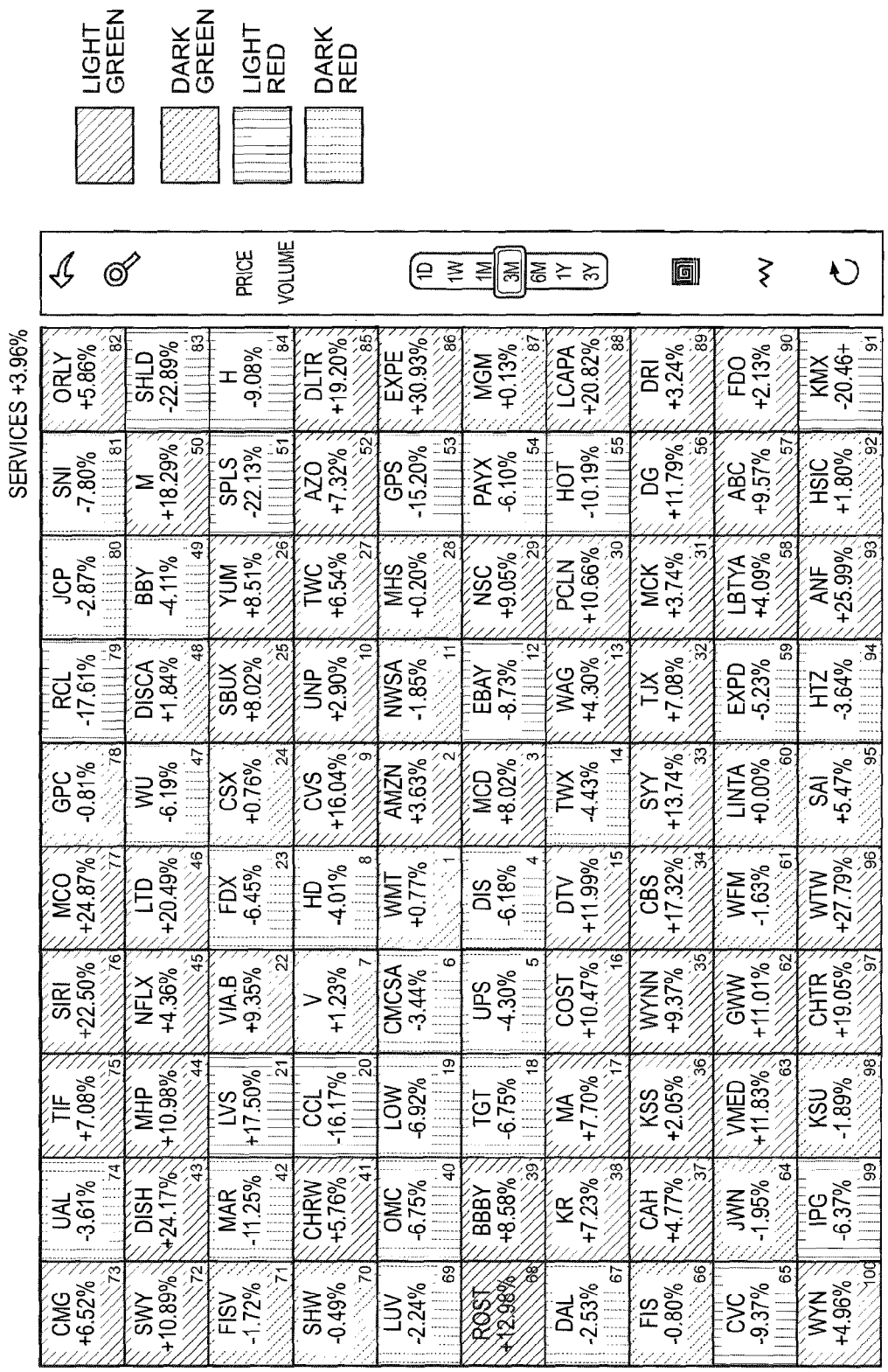
FIG. 3 is a view of a display in an embodiment of the present disclosure, showing a zoomed-in view of price changes in a single sector.

As shown in FIG. 3, the application may display a zoomed view of a particular sector. The sector may be selected by the user, such as by touching a stock in the nine-sector, 900-stock display of FIG. 1 or 2. In the sector view, the user may choose to display price, market capitalization, or volume, such as by selecting from a menu on the side of the screen as shown in FIG. 1. The application may apply the same colorization methods as discussed above with reference to FIGS. 1 and 2. Once in "Sector" display mode, the user may select a different sector for display such as by touching a menu item on the bottom of the screen as shown in FIG. 3.

Figure 7:
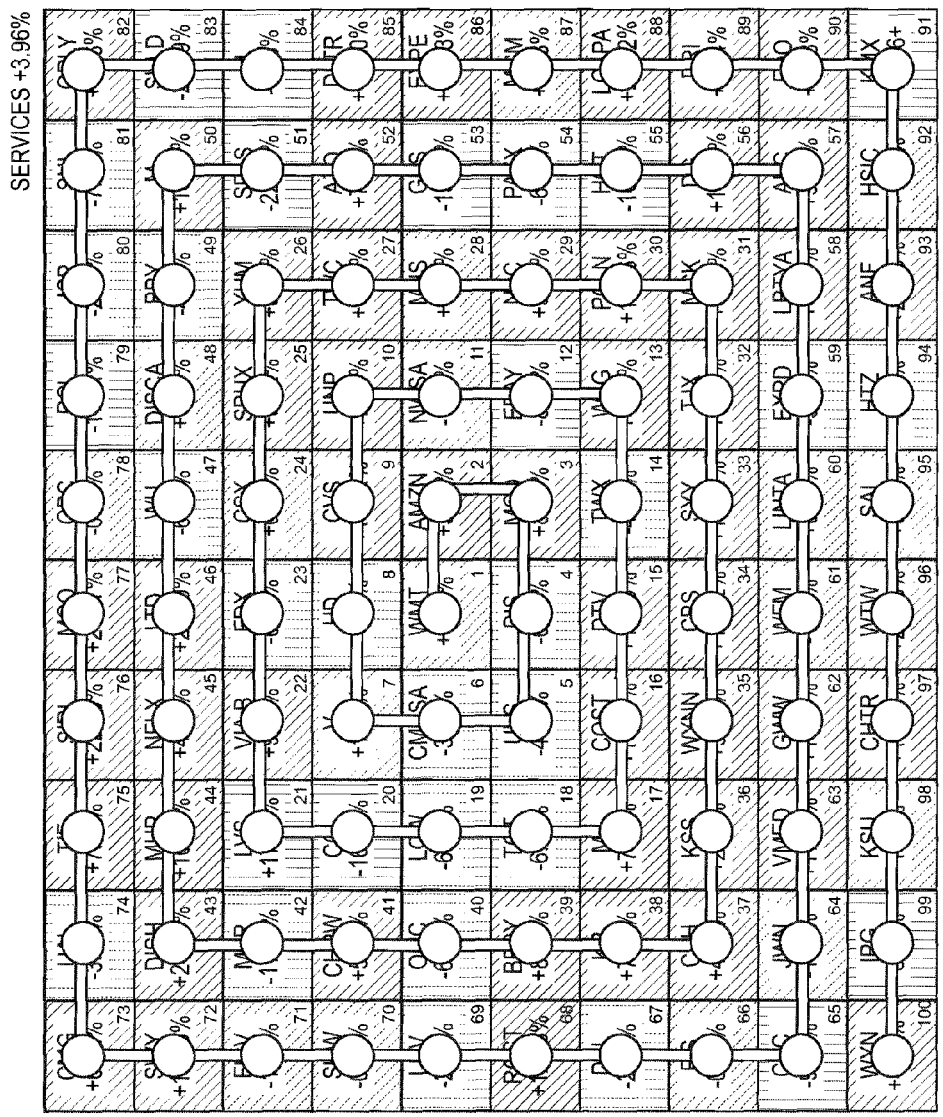
FIG. 7 is another screen shot illustrating the ordering of stocks within a sector.

In an embodiment, the display region for each sector displays icons for 100 stocks in a square pattern, and the displayed stocks are 100 stocks in the sector with the highest capitalization. If the display is limited to US markets, only icons relating to US stocks are displayed, but if the display includes international stocks, the 100 largest firms worldwide in each sector are displayed. As shown in FIG. 7, the stocks of each sector may be ordered in an outward spiral pattern, with the company having the largest market capitalization within that sector at the center. Other arrangements also are possible, such as alphabetical, an inward spiral (i.e., largest stock in corner), top left to bottom right ordering based on market capitalization, amount or percent of price change (winners and losers), or sales volume, zig-zag patterns (e.g., horizontal, vertical, diagonal), or based on some relationship. The ordering may be user-configurable through a menu selection, particular sequence of screen touches, etc. The combination of variable colorization of items based on a performance-related metric such as price, volume, etc., with sequential ordering of the items based upon the performance-related metric and/or one or more other parameter of or relationship between the items, is referred to herein as activity map.

Figure 4:
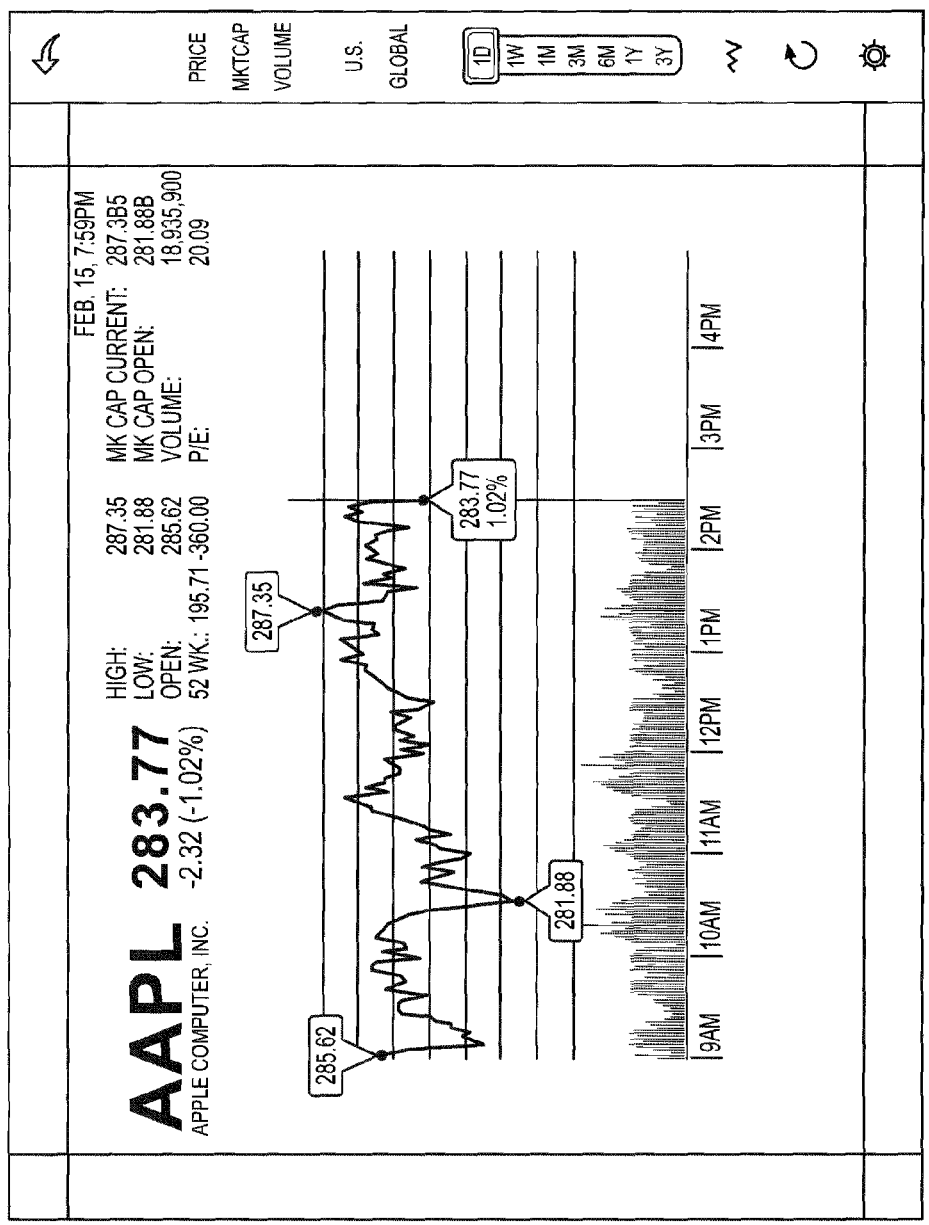
FIG. 4 is a view of a display in an embodiment of the present disclosure, showing a one-day price chart for a single stock.
Figure 5:
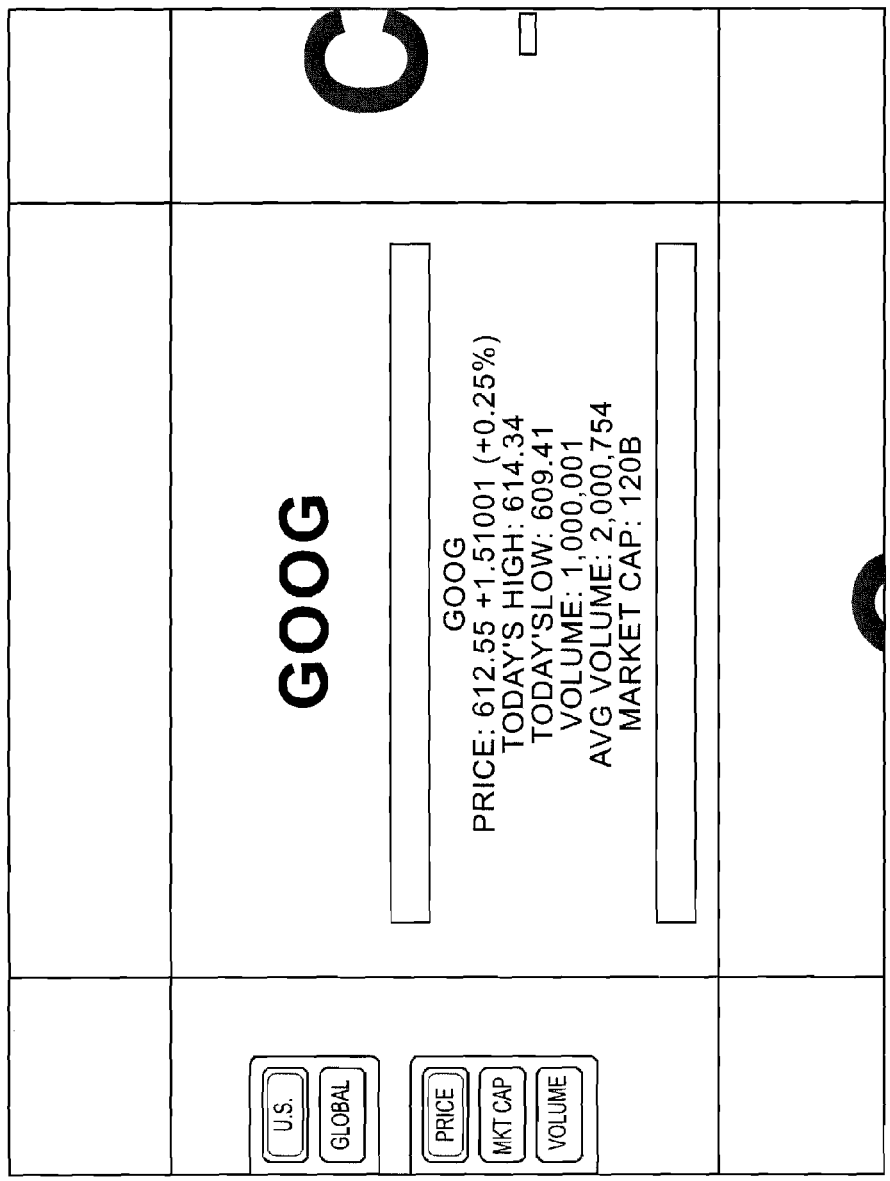
FIG. 5 is a view of a display in an embodiment of the present disclosure, showing an information page for a single stock.

FIG. 4 shows an exemplary level 3 detailed view of a single stock. The stock may be selected by the user, such as by touching a particular stock in the single-sector display of FIG. 3. In the single stock view, the user may choose to display price, market capitalization, or volume, such as by selecting from a menu on the right side of the screen as shown in FIG. 4. The user also may select the period of interest as discussed above with reference to FIGS. 1 and 2. The application may apply the same colorization methods as discussed above with reference to FIGS. 1, 2, and 3. In the example of FIG. 4, the display the is colored red based on the one-day ("1D") price change. FIG. 5 shows an alternate single-stock display. The choice between single-stock displays of FIGS. 5 and 6, and any other available single-stock displays, may be configurable or selectable by the user by a menu, screen touches, etc. In an embodiment, if the stock is identified as a favorite, or put on a watch list stock, it may be highlighted in the display by, for example, changing the color and brightness of the symbols on the icon.

In some embodiments, the single-stock display may include an interface to a stock trading site. The stock trading site can be a public site for stock trading, a site provided by a bank, mutual fund or other investment company at which the user has an account, a site provided by the company whose stock is currently displayed, or a proprietary stock trading application. The interface may include a link, icon, or button that can be touched to initiate the connection to the stock trading site. In an embodiment, the application can be pre-configured to automatically provide account, identification and, optionally, authentication data to the stock trading site, and to provide identifying data for the stock currently displayed, so that with one touch the user can access a stock trading site and begin trading the stock that is currently displayed.

Navigating the Map

In an embodiment in which the display device includes a touch screen display, a user can navigate through different hierarchies (levels) of an activity map. For example, in an exemplary embodiment related to stocks described above with reference to FIGS. 1 through 5, a user can navigate from level 1 (i.e. market display) to level 2 (i.e., sector display) to level 3 (i.e., individual stock display) by touching the map itself. This navigation can include single-finger touching, single finger swiping, and multiple-finger touching or swiping.

In other embodiments, the user can navigate in the same manner between displays comprising different aggregation levels of items. Embodiments may provide the capability of navigating in the same manner through data relating to performance of individuals or groups of individuals performing the same or a similar task or job, e.g., a securities broker. In such an embodiment, a user could navigate from a level-1 display comprising performance data for a plurality of brokerages each having a plurality of brokers, to a level-2 display comprising performance data for the brokers of a single brokerage, to a level-3 display comprising performance data for an individual broker. In this embodiment, performance data may comprise, for example, number of shares traded, gross or net trade revenue, gross or net commission income, etc., each over one or more time periods.

In another exemplary embodiment, a user may have the capability to navigate through data related to elements or parts of one or more systems used for a particular purpose, e.g., a utility transmission system. For example, in such an embodiment a user could navigate from a level-1 display comprising performance data for a plurality of transmission networks (or sub-networks) each having a plurality of transmission elements (e.g., transmission lines), to a level-2 display comprising performance data for the elements of a single transmission network (or sub-network), to a level-3 display comprising performance data for an individual element. In this embodiment, performance data may comprise, for example, reliability data, capacity data, peak or average resource utilization data, etc., each over one or more time periods.

An embodiment of multiple-finger touching is "pinch-to-zoom." In a "pinch-to-zoom" movement, the application identifies two fingers that are touching the display and it compares the relative positions of the two fingers at two time instants, t-1 and t-2. Using conventional techniques known to those of skill in the art, the distance between the two fingers, and the center point between the two fingers, are determined at time instants t-1 and t-2. If the distance metric has increased between t-1 and t-2 by more than a set amount, preferably 30%, the gesture is interpreted as a "pinch out," and if the distance metric has decreased between t-1 and t-2 by less than a set amount, preferably 30%, the gesture is interpreted as a "pinch in." In an embodiment, "pinch out" means "zoom in" and "pinch in" means "zoom out."

The effect of the "pinch-to-zoom" gesture depends, in an embodiment, on the current display. A "zoom in" gesture will enhance the display of the display region located at the center point of the two fingers. A "pinch out" gesture on a level 1 (entire market) display will cause a level 2 (sector) display of the sector at the center point of the two fingers. In alternative embodiments, the display region containing the selected sector may be highlighted by increased size, color or brightness shading. A "pinch out" gesture on a level 2 (sector) display may cause a level 3 view of the individual stock whose icon is located at the center point of the two fingers. A "pinch in" ("zoom out") gesture on a level 3 (stock) display will cause a level 2 (entire sector) display, and a "pinch in" gesture on a level 2 (sector) display will cause a level 1 (entire market) display.

Moreover, other visual and audible effects may be associated with user gestures, such as those described above, to create a unique user experience for navigating statistical data. For example, navigation between hierarchy levels (e.g., between levels 2 and 3) can be associated with blurs, zooms, animated transitions at 30 frames-per-second, and other visual effects, in addition to audio effects such as tones or chimes, and tactile effects such as vibration patterns. Such effects create a. game like feel to the process of navigating statistical data.

Figure 6:
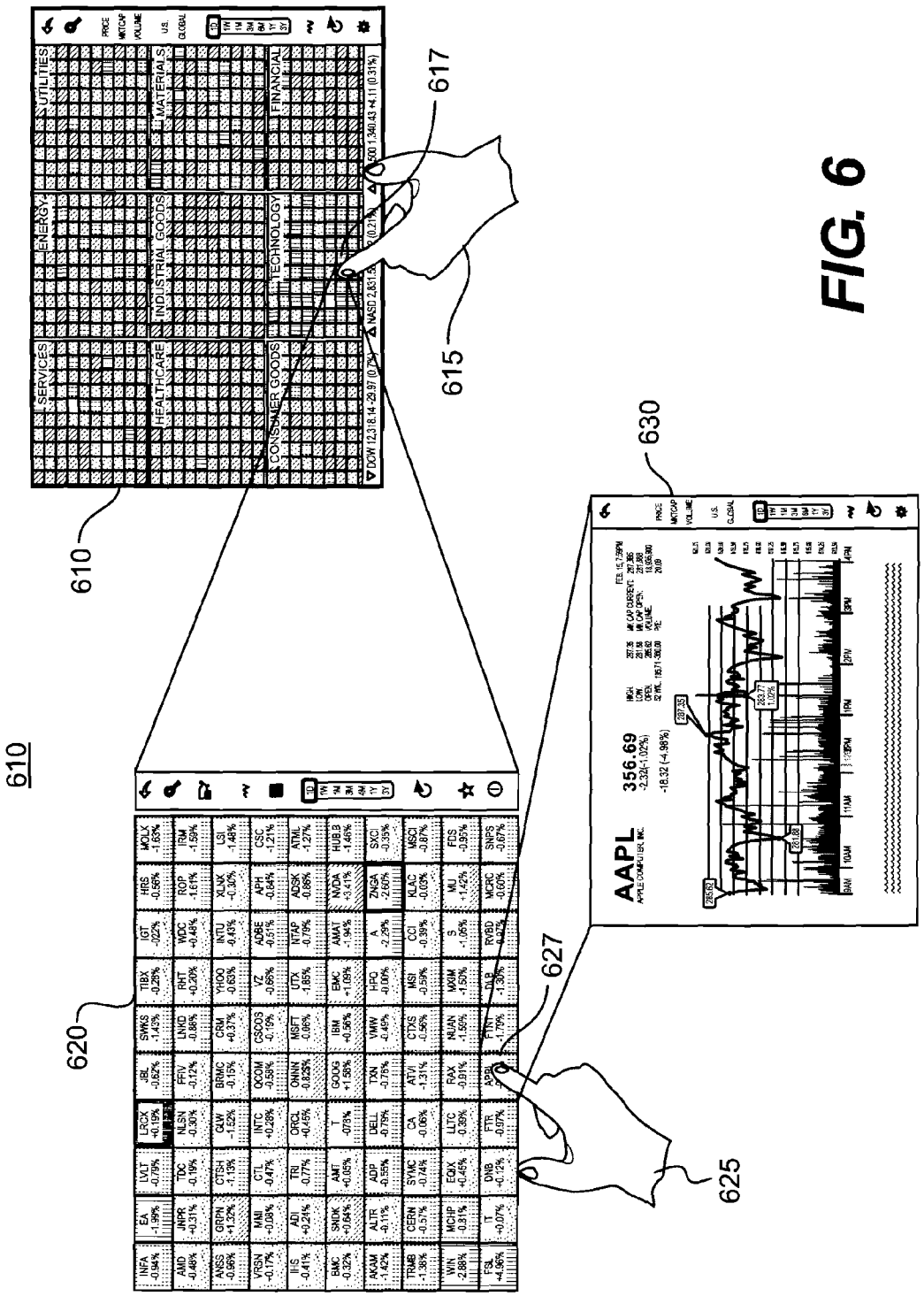
FIG. 6 illustrates the process of zooming from market to sector to individual stock in an embodiment of the present disclosure.

FIG. 6 illustrates an example sequence of screens that a user would see as the user navigated from a market display (level 1), to a sector display (level 2), to a single-stock display (level 3) in the exemplary stock market visualization embodiment. For example, a user may identify a particular sector on the market display whose performance is interesting for some reason. After a user zooms into that sector, the user may identify a particular stock of interest within the sector. The user may zoom into that stock, seeing the display at the front of FIG. 6. After the user is finished viewing the single-stock display, the user may zoom out to the sector display and, optionally, to the market display. The application also may allow the user to zoom directly between the market display and the single-stock display.

FIG. 6 illustrates a method 600 of navigating through the map for the exemplary embodiment related to stocks. A market display (level 1) 610 is shown. Using finger 615, a user touches a point in display region 617 corresponding to a sector of stocks, thereby causing a sector display (level 2) 620 of the selected sector. Using finger 625, the user touches an icon 627 corresponding to a specific stock, which results in display 620 of information relating to the selected stock.

Figure 13:
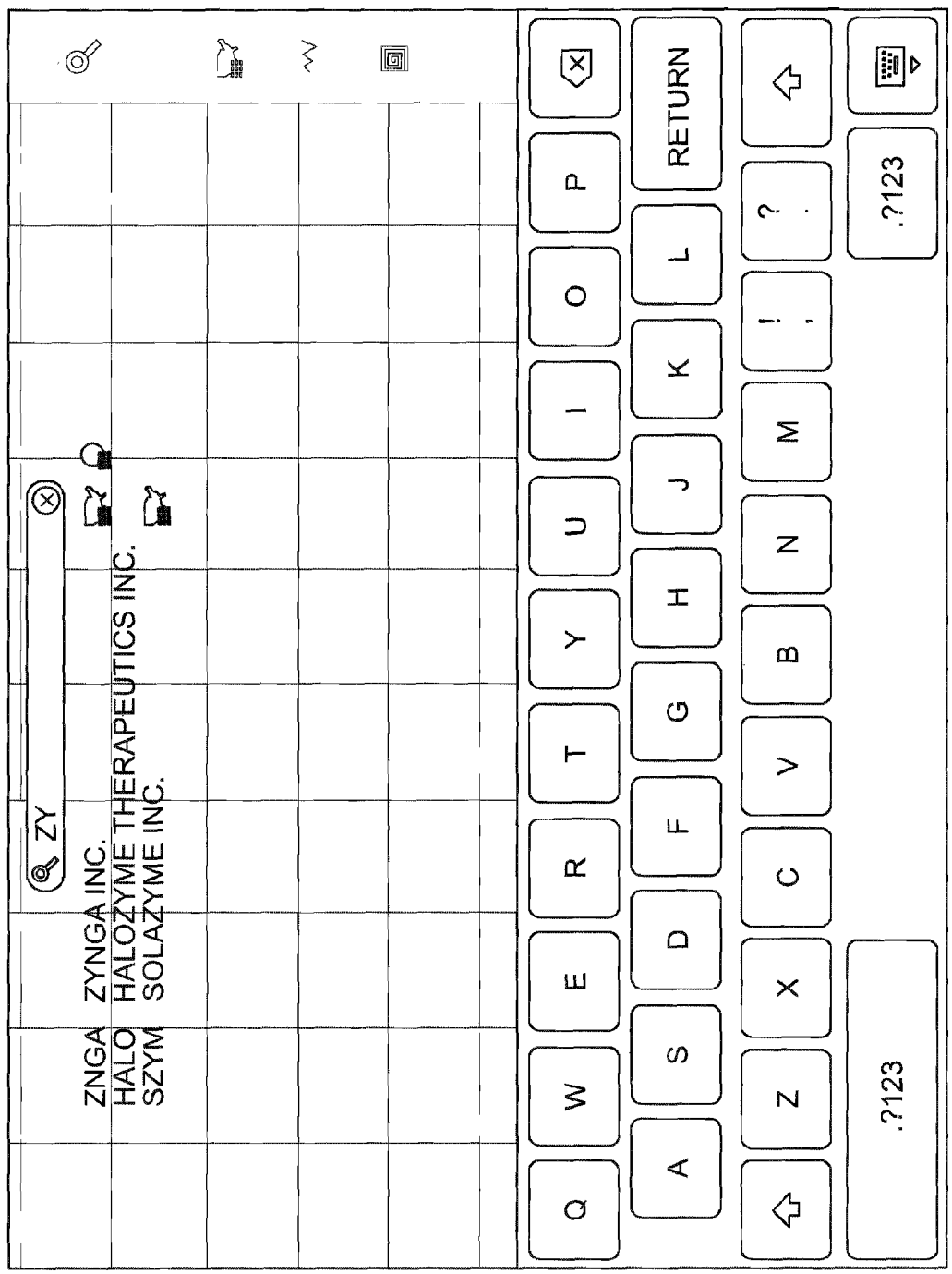
FIG. 13 is a view of a display in an embodiment, showing a search interface.
Figure 14:
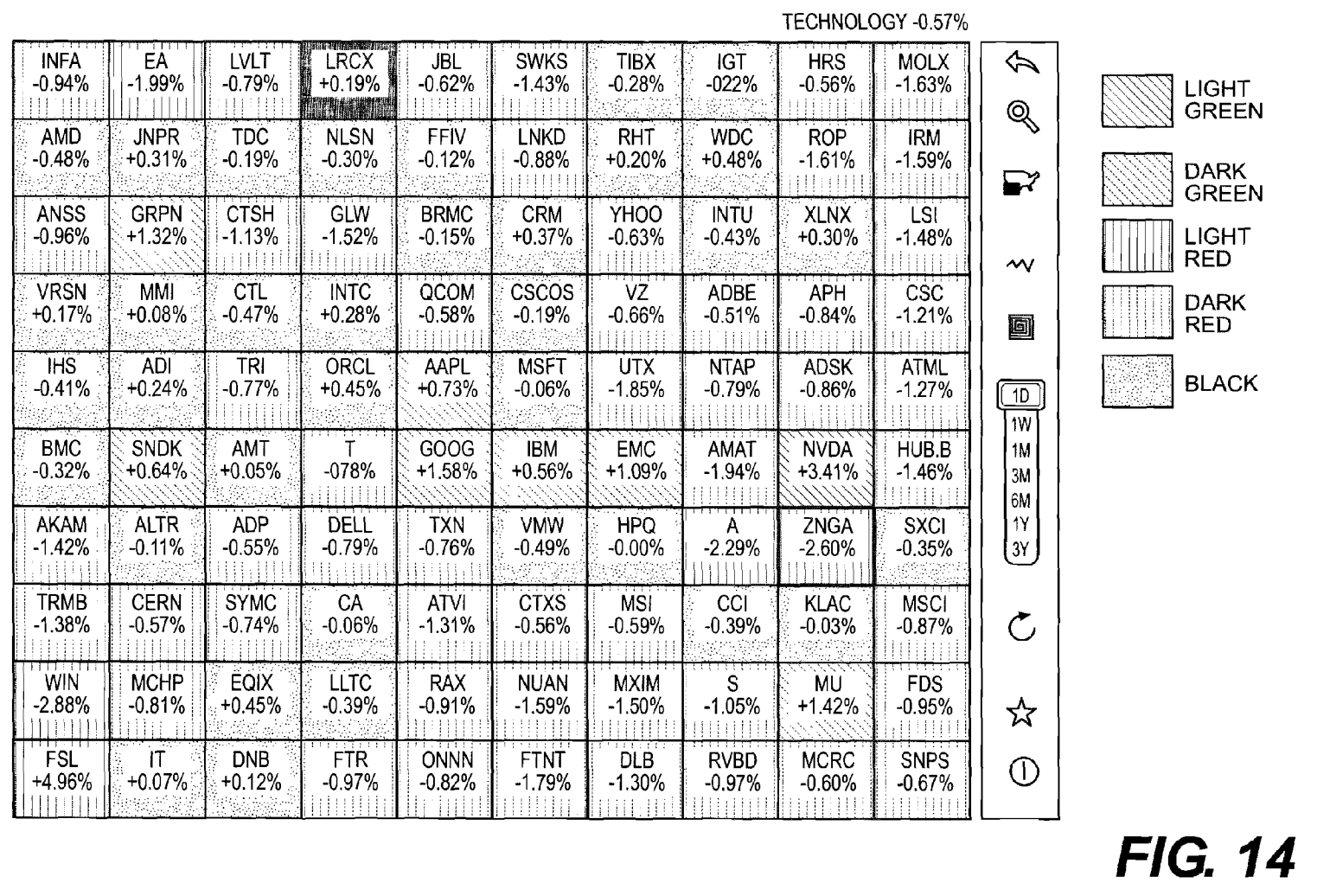

In addition to navigation using fingers to point, pinch or swipe, a user can navigate the activity map by searching. In an embodiment, the application provides a search interface which allows the user to type in the name of a stock symbol or other search query. In another embodiment, when the search query returns multiple search results, these results are displayed visually. The results may be displayed as their own heat map or activity map. In other words, if a search query returns a subset of the items or a subset from the data set, that subset can be mapped. For example, a search query for stocks with dividends greater than 3% would return multiple hits and the results themselves could be mapped. FIG. 13 illustrates an exemplary search interface with several search results, some of the results also displaying icons representing a navigation of the user to visual top hierarchy (level 1) for identification of the query within the activity map. Alternatively, touching the text for the same search result navigates the user to the bottom hierarchy (level 3) of the activity map, individual section of the map for that result. The user can choose where and what form in the hierarchy they wish to view their search results. When there is a match, the icon corresponding to the matched stock can be highlighted. In FIG. 14, for example, the user has selected the level 1 map-based search result, which is displayed as a highlighted tile using a back-lighting effect.

Statistical Data Delivery System

One particular advantage of the embodiments of the present disclosure is to make the application's user interface perform as quickly, smoothly, and seamlessly as possible. Two key factors determining user interface performance are latency between data request and receipt and rendering delay. Thus, it is advantageous to provide data in the format that allows the fastest possible transmission and rendering. Accordingly, another aspect of the present disclosure involves systems and methods of processing and compression of data used in the visual display of statistical information. The system includes a server and a client. The server may be software executing on any type of general- or special-purpose computer capable of performing the data processing and compression, or may be a "virtual" or "cloud-based" server executing on one or more large, general-purpose computers along with other virtual servers and applications, both related and/or unrelated. The client may be a software routine that is part of a data visualization embodiment or an application, executing on the device that displays the information in the manner described above.

Figure 15:
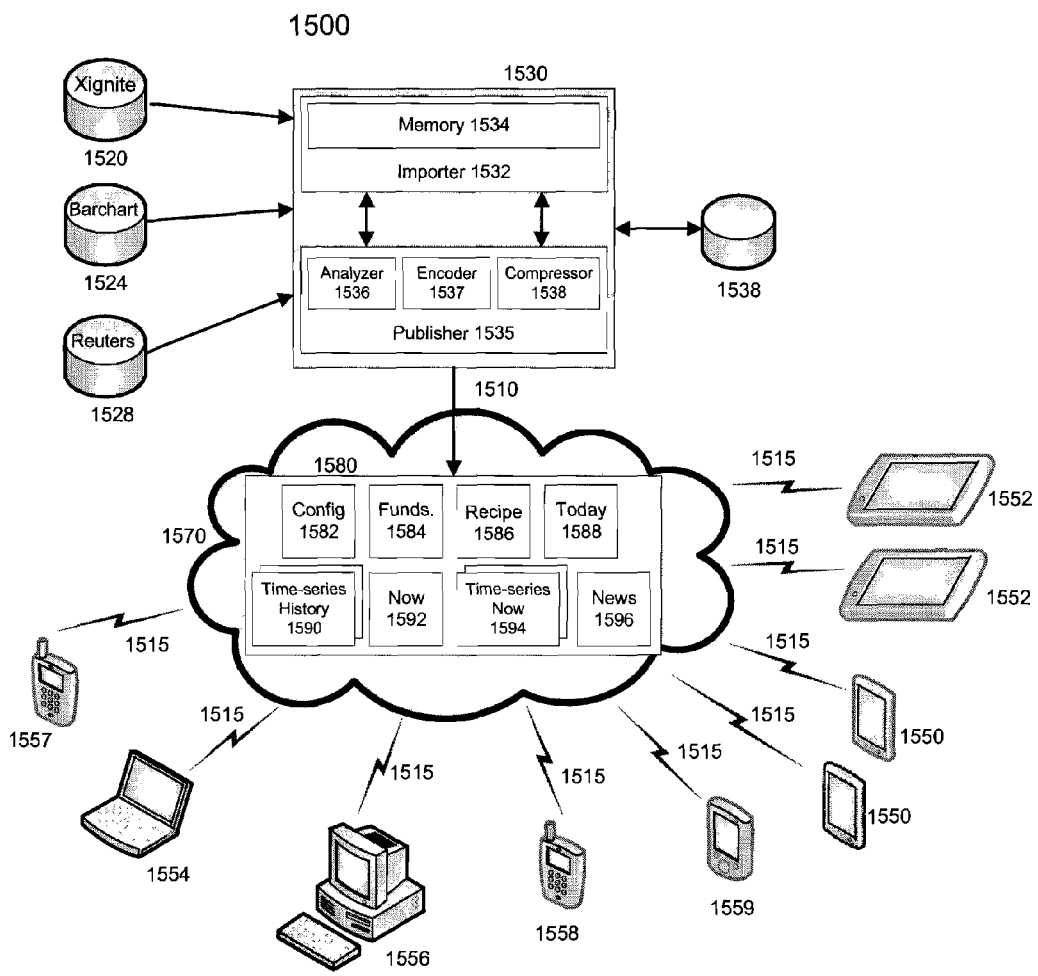
FIG. 15 is a high-level block diagram of a statistical data delivery system according to one or more embodiments of the present disclosure.

An embodiment of an exemplary statistical data delivery system 1500 is shown in FIG. 15. In the exemplary embodiments described below, statistical data delivery system 1500 comprises a system for delivering financial data, e.g., current and historical data related to the performance and/or risk of securities such as stocks. In other embodiments, statistical data delivery system 1500 may comprise a system for delivering statistical data related to the performance of a plurality of individuals or groups engaged in performing a particular task or job (e.g., securities traders). In other embodiments, statistical data delivery system 1500 may comprise a system for delivering statistical data related to the performance of one or more parts of one or more systems (e.g., utility transmission or distribution systems, manufacturing systems, computing systems, etc.). However, these examples are non-limiting and statistical data delivery system may be used to deliver statistical data related to a wide range of applications. Persons of ordinary skill will recognize that in such embodiments, elements of statistical data delivery system may be adapted to the particular application within the spirit and scope of the present disclosure.

Exemplary statistical data delivery system 1500 comprises financial data sources 1520, 1524, and 1528, a financial data server 1530, a data store 1538, a distribution server 1580, one or more display devices 1550, 1552, 1554, 1556, 1557, 1558, and 1559, and communication network links 1510, 1515. Exemplary statistical data delivery system 1500 includes a financial data server 1530. Financial data server 1530 comprises an importer component 1532 and a publisher component 1536. FIG. 15 shows importer component 1532 and publisher component 1536 provided by the same server entity, although in another embodiment, the functions of importer component 1532 and publisher component 1536 may be provided by different server entities.

The importer component 1532 of financial data server 1530 is coupled to one or more financial data sources via a communications link 1510. Exemplary sources of financial data include Xignite, 1520 (accessible at www.xignite.com), barchart.com, 1524 (accessible at www.barchart.com), and Reuters, 1528 (accessible at www.reuters.com). In an embodiment, importer 1532 obtains financial data pertaining to all stocks of interest in any commonly used format. One format for exchange of financial data is Extensible Markup Language (XML). Importer 1532 uses a conventional HTTP-based protocol, for example SOAP (Simple Object Access Protocol) to obtain financial data in XML format from financial data sources 1520, 1524. In an embodiment importer 1532 obtains updated financial data from each financial data source periodically at five minute intervals.

The data obtained from the financial data sources is stored on data store 1538 coupled to importer 1532, preferably in an optimized format. This includes, in an embodiment, historical data and the most recently updated data. In an embodiment, data store 1538 may be stored on a database server, which may be hosted on the same server entity as importer 1532 or a different server entity. In an embodiment, data store 1538 is an Apache Cassandra database. In an alternative embodiment, data store 1538 may comprise a data structure in persistent memory 1534 on the same server as importer 1532.

XML is a text-based format that optimized for simplicity, human readability, and interoperability over the Internet, albeit at the expense of size or efficiency. In particular, the text-based representation of the content and the additional markup describing the content structure result in large file sizes. Given the limited bandwidth available in some communications networks, such as, for example, a wireless network, such large files take a long a time to download to wireless devices, such as an iPad, iPhone, or portable device, resulting in a less interactive user experience with the application using the XML data.

To address this drawback, the financial data server 1530 processes the standard-form financial data and encodes it into a more compressed format. In an embodiment, publisher component 1536 of financial data server 1530 comprises an analyzer component 1536 that analyzes and processes the financial data, an encoder component 1537 that encodes more complex data into numerical formats and provides additional analytical information, and a compressor component that encodes the data in, preferably, a binary data format. In this way, the server pre-processes and packages the data for efficient storage and distribution.

Financial data server 1530 saves the pre-processed and packaged financial data on distribution server 1580 for distribution to client display devices. In an embodiment, distribution server 1580 distributes pre-processed and packaged financial data to client display devices using the Hypertext Transfer Protocol (HTTP). In an embodiment, financial data server 1530 and distribution server 1580 are hosted on the same server entity, and in another embodiment, financial data server 1530 is hosted on a different server entity from distribution server 1580. The functions of a single server entity as described herein may be performed by one or more server computers using techniques well-known to those of skill in the art. In an embodiment, distribution server 1580 is hosted on a cloud service 1570. Exemplary cloud service 1570 is the Simple Storage Service (S3) provided by Amazon.com.

In an embodiment, distribution server 1580 distributes pre-processed and packaged financial data to one or more display devices using HTTP. Exemplary display devices include smart phones 1550 (for example, an Apple iPhone or a Google Android cell phone), a tablet computer 1552 (for example, an Apple iPad), laptop computer 1554, desktop computer 1556, mobile phone 1558, and personal digital assistant 1559. In some embodiments, display devices may include a specialized device 1557 with hardware and software specifically configured for use by personnel within a specific industry, such as stock traders in the financial industry, service personnel in the utilities industry, or process engineers in the manufacturing industry. In an embodiment, the display device pulls data from distribution server 1580 via an HTTP request.

In an embodiment, one or more of these devices, such as smart phone 1550, table computer 1552, mobile phone 1558, personal digital assistant 1559, and/or specialized device 1557, have limited display capabilities. For example, a smart phone 1550 may have a relatively small display screen size and limited screen resolution (e.g., pixel count). For example, commonly available smart phones have 3.5- to 4.5-inch (diagonal) displays with typical resolutions of 960 pixels by 640 pixels. The limited display capabilities mean that it is difficult to simultaneously display dynamic data regarding a large number of similar data items. In an embodiment, some of these devices, including smart phone 1550, tablet computer 1552, mobile phone 1558, specialized device 1557, and personal digital assistant 1559, may have a touch screen interface for input.

The components of statistical data delivery system 1500 are interconnected via exemplary communication link types 1510 and 1515. Exemplary link type 1510 includes any form of communications network connection known to those of skill in the art, including, by way of example, ethernet and other local area network (LAN) communications networks, the internet, World Wide Web, and other wide area network (WAN) communications networks, and all forms of wireless or telecommunications links Communications link types 1515 are likely to include a link over a wireless network, a telecommunications network, or some other form of network that is bandwidth or speed-constrained in some way. In an embodiment, it is likely that one or more display devices

1550, 1552, 1554, 1556, 1557, 1558, 1559 may be coupled to distribution server via a communications network that include a link type 1515, as shown in FIG. 15.

Compressed Data Files

In one embodiment, publisher component 1535 of financial data server 1530 generates multiple compressed data files, with data and information distributed among the files based on its time sensitivity and particularity. The file types include static files comprising data which doesn't change often, such as company descriptions and other configuration data. File types also include files containing more dynamic data such as, in some embodiments, "today" files comprising data needed for today's calculations (e.g., yesterday's closing information); "now" files comprising very time-sensitive information (e.g., current stock prices); and individual stock files. The financial data server 1530 periodically updates the files according to their time sensitivity. For instance, the "today" files can be updated less frequently than the "now" files. On the other hand, the individual stock files contain information particular to that stock such as company name, description, recent headlines, current stock price, and multiple time series charts covering a range of periods of interest corresponding to the options available to the user.

Now follows a description of the different data files and data elements used in an embodiment of a statistical data delivery system. As used in the following description, data type "utf8.8" is a utf8 encoded string prefixed with a uint8 (unsigned 8 bit integer) length; data type "utf8.16" is a utf8-encoded string prefixed with a uint16 length; data type "dollar" is a uint32 value that is multiplied by 1000 in order to provide 0.1-cent accuracy; and data type "symbol" is a stock symbol that has been encoded into an unsigned 32 bit integer (uint32) as described in more detail below. All data types in the embodiments described below are in big endian format, as commonly understood by persons of ordinary skill in the art.

Header. Each file uses the same format header:

| | |
|---|---|
| ID | char4 |
| Size | uint32. |
| CRC32 | uint32 |

In the header file, ID is the file name, where the last digit is used to determine the file format, Size is the number of bytes in the payload, and CRC32 is a checksum for the payload.

Configuration File.

The Configuration file provides configuration and version information for the client display device. This will be downloaded by the client display device every time it is started and is used to determine any other files that may need to be downloaded.

The payload of the Configuration file contains the following data elements:

| | |
|---|---|
| Data Storage | utf8.8 |
| Fundamentals Version | uint32 |
| Today Version | uint32 |
| Recipe Count | uint8 |
| <ArrayOfRecipes> | |
| Recipe ID | uint8 |
| Recipe Version | uint32 |
| </ArrayOfRecipes> | |

In the Configuration file, Data Storage is the URL of the directory on the distribution server that contains the current set of files. Fundamentals Version is the version number of the newest available Fundamentals file. Today Version is the version number of the newest available Today file. Recipe Count is the number of available recipes, and this determines the number of recipe records that follow. Following Recipe Count is an array of Recipes, where each array element includes Recipe ID, the ID number of the recipe, and Recipe Version, the version number of newest available Recipe file. The version number in an embodiment is a sequential number based on time stamp units.

Fundamentals File.

The Fundamentals file provides fundamental information for every stock that is being tracked by the system and will be downloaded by the client display device whenever the Configuration shows that a newer version of this file is available. In an embodiment the payload is compressed using "zip" compression. The payload of the Fundamentals file contains the following data elements:

| | |
|---|---|
| Fundamentals Version | uint32 |
| Stock Count | uint16 |
| <ArrayOfStocks> | |
| Symbol | symbol |
| Name | utf8.8 |
| </ArrayOfStocks> | |

In the Fundamentals file, Fundamentals Version is the Version number of the Fundamentals file, Stock Count determines the number of fundamental records that follow. Following Stock Count is an array of Stocks, where each array element includes Symbol, the encoded stock symbol, and Name, the name of the stock.

Recipe File.

The Recipe file determines which stocks are contained within each sector. In an embodiment, a recipe contains 9 sectors with a variable number of stocks in each, and the order of stocks in the recipe file is irrelevant. The order of the sectors is from bottom-left to upper-right moving horizontally. The Recipe file will be downloaded by the client display device whenever the Configuration shows that a newer version of this file is available. The filename should be recipe_<ID> where <ID> is the ID number of the recipe as denoted in the Configuration file. The payload of the Recipe file contains the following data elements:

| | |
|---|---|
| Recipe ID | uint8 |
| Recipe Version | uint32 |
| Recipe Name | utf8.8 |
| Recipe Icon URL | utf8.8 |
| Index Count | uint8 |
| <ArrayOfIndices> | |
| Index ID | symbol |
| </ArrayOfIndices> | |
| <ArrayOfSectors> | |
| Sector Name | utf8.8 |
| Sector Small Name | utf8.8 |
| Stock Count | uint16 |
| Symbols | symbol[Stock Count] |
| </ArrayOfSectors> | |

In the Recipe file, Recipe ID is the ID number of this recipe, Recipe Version is the version number of this Recipe file, Recipe Name is the name of this recipe (for example, US, Global, etc), Recipe Icon URL is the location, preferably on the distribution server, of a PNG file, a bitmapped image file, that contains the icons to use for this recipe, and Index Count is the number of indices to show when this Recipe is active. Following Index Count is an array of indices, in which Index ID is the Index to show when this Recipe is active. Following the array of indices is an array of sectors, in which each array element contains Sector Name, the name of the sector, Sector Small Name, the small name of the sector, stock Count, the number of stocks contained in this sector, and Symbols, an array of the symbols of the stocks in this sector.

Today File.

The Today file includes all of the historical reference points needed for comparisons within the application for today, i.e., the instant day. The Today file will be downloaded by the client display device whenever the Configuration file shows that a newer version of this file is available, usually once per day. The payload of the Today file contains the following data elements:

| | |
|---|---|
| Today Version | uint32 |
| Index Count | uint8 |
| <ArrayOfIndices> | |
| Index ID | symbol |
| Index Name | utf8.8 |
| Short Name | utf8.8 |
| Last Values | dollar |
| </ArrayOfIndices> | |
| <ArrayOfTimeSeriesLabels for each 1W, 1M, 3M, 6M, 1Y, 5Y> | |
| Time Series X Label Count | uint8 |
| <ArrayOfLabels> | |
| Tick Number | uint16 |
| Label | utf8.8 |
| </ArrayOfLabels> | |
| </ArrayOfTimeSeriesLabels> | |
| Stock Count | uint16 |
| Stock Element Size | uint16 |
| <ArrayOfStocks> | |
| Symbol | symbol |
| Prices | dollar |
| Average Volumes | uint32 |
| 3M Average Volume | uint32 |
| Shares Outstanding | uint32 |
| Open Price | dollar |
| 52 Week Low | dollar |
| 52 Week High | dollar |
| P/E | uint32 |
| Dividend Yield | uint32. |
| </ArrayOfStocks> | |

In the Today file, Version is the version number of this Today file, Index Count is the number of indices stored in the file. Following Index Count are an array of indices, an array of time series labels, an array of labels, and an array of stocks. In the array of indices, Index ID is the ID of this index, Index Name is the long display name of this index, Short Name is the short display name of this index, and Last Values is the Previous close of the index.

Following the array of indices is an array of arrays of time series label data containing label data relating to each of the pre-determined time series for which historical data is displayed. In an embodiment, the data for each predetermined time series element is always stored in the same order, namely, in an embodiment, 1D (where 1 day data is stored), 1W, 1M, 3M, 6M, 1Y, and 5Y. Each time series has a different set of labels to be displayed, and the number and content of labels may change depending on the current date. For example, if the selected time series is 1M and the current date is May 21, 2012, an embodiment will display 20 date labels for each of the 20 trading days from April 23 to May 21. The array element for the array of time series labels is Time Series X Label Count, which is the number of labels to follow. Following this is an array of Time Series Labels for the time series, where Tick Number is the tick where the label should be placed when the time series data is displayed, and Label is the textual or numerical label for that tick. Because the time series data elements are stored in the same order, in an embodiment, the first array of arrays describes the labels for the 1W time series, the second array of arrays describes the labels for the 1M time series, and so on, so that the last array of arrays contains the labels for the 5Y series.

Following the array of arrays of time series labels are Stock Count, which is the number of stocks contained in the payload, and Stock Element Size, which is the number of bytes contained within each element in the stocks array. The Stock Element Size data element can be used to expand the number of fields in the stocks element without having to replace earlier code.

Next is an array of Stocks, comprising several elements for each Stock. Symbol is the ticker symbol for this stock, encoded as described below. Prices is a data element used for price comparisons and comprises the closing price for each of the time series, in the predetermined time series order. Thus, Prices contains the closing prices for the 1D period (i.e., last trading day), the 1W period, (last five trading days); 1M (last 20 trading days); 3M (last 65 trading days); 6M (last 130 trading days); 1Y (last 260 trading days); and 5Y (last 1300 trading days).

Next in the Stocks array is Average Volumes, which contains calculated average volumes over each time series. Thus Average Volumes contains average volume for 1D (0); 1W, average volume over days 1-5; 1M, average volume over days 1-20; 3M, average volume over days 65-130; 6M, average volume over days 130-195; 1Y, average volume over days 260-325 days; and 5Y, average volume over days 1235-1300.

Next in the Stocks array is 3M Average Volume, which is a calculated average volume for days 1-65. Shares Outstanding is the number of shares outstanding for the stock and is used to determine market capitalization by multiplying by current stock price. Open Price is the opening price at the beginning of the time series. 52 Week Low is the low price over the preceding 52 weeks; and 52 Week High is the high price over the preceding 52 weeks. P/E is the current price to earnings ratio multiplied by 1000. A zero value means that P/E data is not available, and "−1" (0xffffffff) means negative earnings. Dividend Yield is the dividend yield multiplied by 1000.

Now File.

The Now file contains the current information for all stocks. The payload of the Now file contains the following data elements:

| | |
|---|---|
| Index Count | uint8 |
| <ArrayOfIndices> | |
| Index ID | symbol |
| Index Value | dollar |
| </ArrayOfIndices> | |
| Stock Count | uint16 |
| Stock Element Size | uint16 |
| <ArrayOfStocks> | |
| Symbol | symbol |
| Price | dollar |
| Expected Volume | uint32 |
| Actual Volume | uint32 |
| Timestamp | uint32 |
| Today's Low | dollar |
| Today's High | dollar |
| </ArrayOfStocks> | |

In the Now file, Index Count is the number of indices stored in file, and is followed by an array of indices. Each array element includes Index ID, the ID of the index, and Index Value, the current value of the index. Following the array of indices are Stock Count, which is the number of stocks contained in the payload, and Stock Element Size, which is the number of bytes contained within each element in the stocks array. The Stock Element Size data element can be used to expand the number of fields in the stocks element without having to replace earlier code.

Next is an array of stocks data. For each array element, Symbol is the encoded symbol for the stock, Price is the current price, Expected Volume is the predicted average volume for the current trading day up to the current tick, Actual Volume is the current volume for the day, Timestamp is the date and time of the quote in Unix time, Today's Low is the low price for the day, and Today's High is the high price for the day.

Time Series Files.

Figure 8:
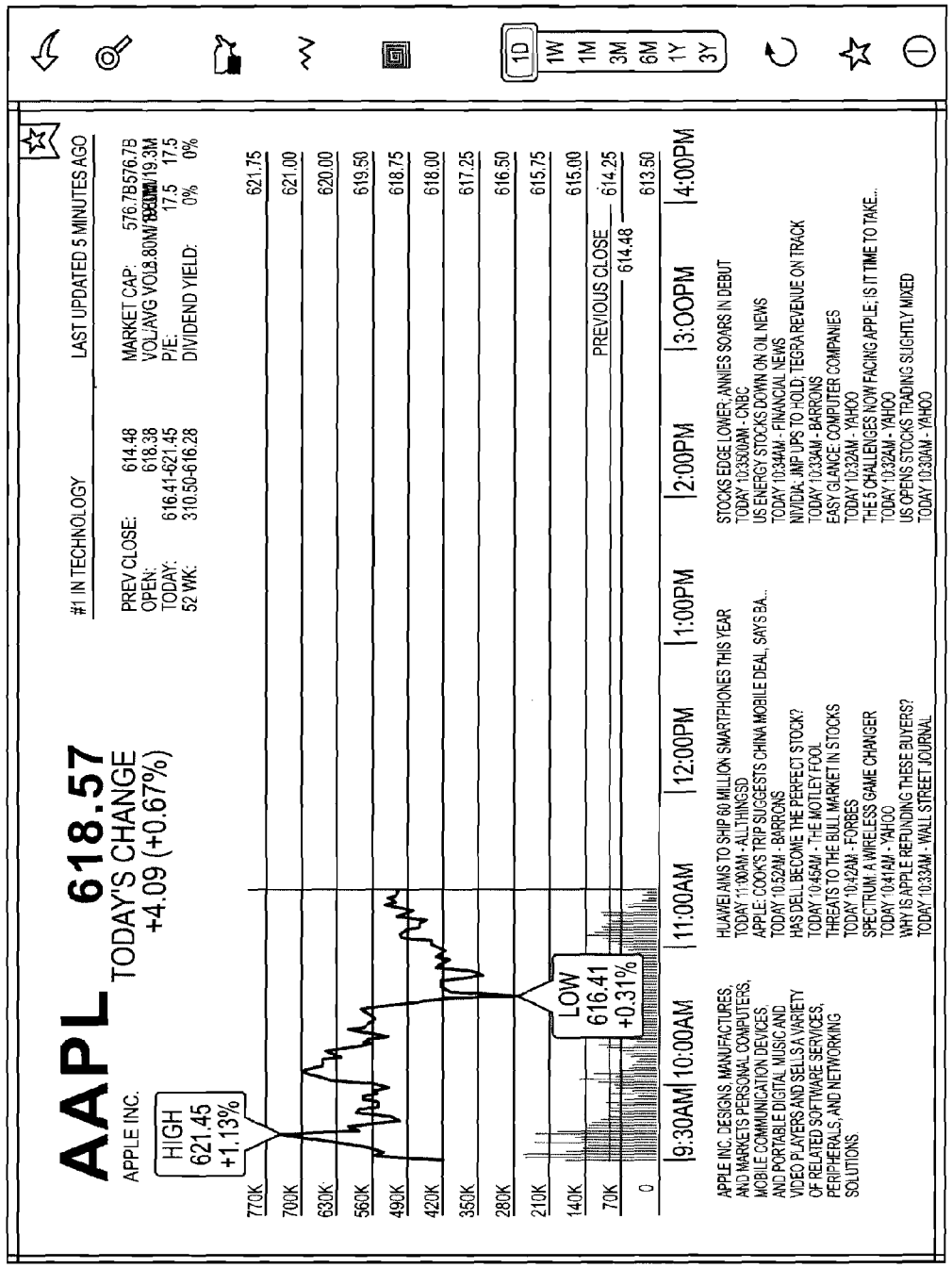
FIG. 8 is a view of a display in an embodiment of the present disclosure, showing an information page for a single stock.
Figure 9:
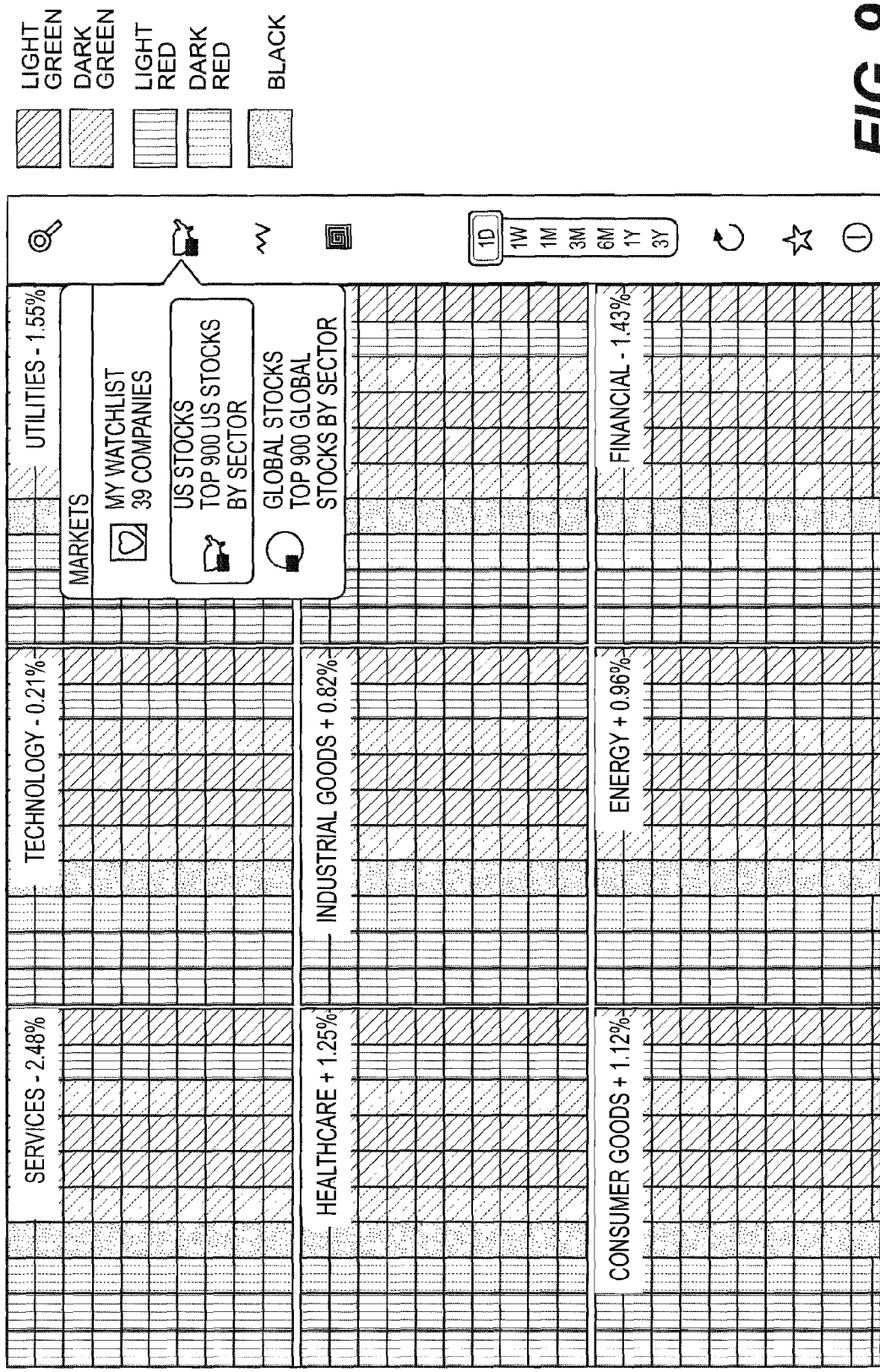
FIG. 9 is a view of a display in an embodiment, showing selection of a reference index.

Financial data applications may provide a graphic display of fluctuations of price and volume over a time period in a time series graph. Exemplary time series graphs are shown in FIGS. 4 and 8. In a conventional client/server financial data application, the time series graph is prepared by the server and transmitted to the client as a graphical image. Unlike conventional financial data applications, embodiments of the present disclosure transmit the underlying data in a binary format to the display device client. The display device client then can use this data to render one or more time-series graphs. The size of the binary data file transmitted is significantly smaller than the size of the corresponding graphics file, and thus can be transmitted much more efficiently. Other statistical data applications may display similar time series related to other statistics, such as utilization or capacity of a particular element of a system (e.g., a utility transmission system) over various time periods.

In an embodiment, a time series graph is specified to be 780 pixels wide, a width that easily fits within the display specifications of many limited display devices. There are two different sampling rates used, which makes for graphs composed of either 390 or 260 ticks. Table 1 below shows the relationship between Time Frame, Actual Time, Ticks, and Time/Tick:

TABLE 1

| Time-frame | Actual Time | Ticks | Now | History | Time/Tick |
|---|---|---|---|---|---|
| 1 D | 6.5 hours | 390 | ≤390 | N/A | 1 minute |
| 1 W | 5 days | 390 | 78 | 312 | 5 minutes (78/day) |
| 1 M | 20 days | 260 | 13 | 247 | 30 minutes (13/day) |
| 3 M | 13 weeks (65 days) | 390 | 6 | 384 | 1 hr 5 mins (6/day) |
| 6 M | 26 weeks (130 days) | 260 | 2 | 258 | 3 hrs 15 mins (2/day) |
| 1 Y | 52 weeks (260 days) | 260 | 1 | 259 | 1 day |
| 5 Y | 260 weeks | 260 | 0 | 260 | 1 week |

As shown in FIGS. 4 and 8, volume data is displayed on the bottom of the time series graph. There is one vertical line per tick with either one pixel (for 390 ticks) or two pixels (for 260 ticks) between it and the next tick. At the top of the time series graph is the price. Although price data is provided in ticks, in an embodiment, price data is not necessarily plotted as such. The volume and price for each tick are represented by an unsigned 8 bit integer, which can represent any number between 0-255. As such, price and volume data values may be scaled. Volume is scaled between 0 (represented as 0) and the highest tick volume (represented as 255); and price is scaled between the lowest tick price (represented as 0) and the highest tick price (represented as 255. The low and high data values also are stored. Advantageously, because vertical resolution (price and volume data) are scaled, and horizontal resolution (the tick count) is scaled to fit onto a 780-pixel-wide display screen, the data in the time series file allows the display device client to render a time series graph on most limited display devices. Moreover, a statistical data server (e.g., financial data server 1530) does not need to calculate or provide data files to accommodate different-sized display screens on different client display devices. There are two files that store time series information, the Time Series History file and the Time Series Now file. The "History" and "Now" columns in Table 1 show the number of points from each file used to construct a time series for each particular Timeframe.

Time Series History File.

The Time Series History file contains the historical data necessary to display a time series for a single stock for every time series except for the current day. This will be downloaded by the client display device whenever the user navigates to display data regarding a single stock and the currently cached history is out of date. The filename, in an embodiment, is timehist_<SYMBOL>, where <SYMBOL> is the ASCII stock symbol. The payload of the Times Series History file contains the following data elements:

| Symbol | symbol |
|---|---|
| <ArrayOfGraphs for each 1W, 1M, 3M, 6M, 1Y, 5Y> | |
| Open Price | dollar |
| Low Price | dollar |
| Low Tick | uint16 |
| High Price | dollar |
| High Tick | uint16 |
| Volume | uint32 |
| Prices | uint8[x] |
| Volumes | uint8[x] |
| </ArrayOfGraphs> | |

In the Time Series History file for each stock, Symbol is the symbol for the stock. Following Symbol is array of graph data elements for each of the historical time series (1W, 1M, 3M, 6M, 1Y, 5Y). For historical time series, data elements are Open Price, the opening price for this period, Low Price, the low price (used for scaling), Low Tick, the tick when the low price occurred, High Price, the high price (used for scaling), High Tick, the tick when the high price occurred, and Volume, the high volume (used for scaling). Prices and Volumes are arrays of scaled price and volume value, each with the number of elements given by the "History" column in Table 1.

Time Series Now File.

The Time Series Now file contains the current (today) data necessary to display a time series for a single stock. This will be downloaded by the client whenever the user navigates to display data regarding a single stock. The filename in an embodiment is be time_<SYMBOL>, where <SYMBOL> is the ASCII stock symbol. The payload of the Times Series Current file contains the following data elements:

| Symbol | symbol |
|---|---|
| Minutes Elapsed | uint16 |
| Prices | dollar[Minutes Elapsed] |
| Volumes | uint32[Minutes Elapsed] |
| Open Price | dollar |
| Low Price | dollar |
| Low Tick | uint16 |
| High Price | dollar |
| High Tick | uint16 |

In the Time Series Now file for each stock, Symbol is the encoded symbol for this stock, Minutes Elapsed is the number of minutes elapsed today (where minutes run from 1-390), Prices is an array of price data by minute ticks for each elapsed minute, Volumes is an array of volume data by minute ticks for each elapsed minute, Open Price is the opening price for today, Low Price is the low price, Low Tick is the tick showing when the low price occurred, High Price is the high price, and High Tick is the tick showing when the high price occurred.

News File.

The News file contains the description and news headlines for a single stock. The payload is organized into chunks to allow for the addition of new chunks in the future. If there are no values to put into a chunk, then the chunk can be skipped entirely. This will be downloaded by the client whenever the user navigates to display data regarding a single stock. The filename in an embodiment is be news_<SYMBOL> where <SYMBOL> is the ASCII stock symbol. The HTTP header If-Modified-Since can be used to keep the client display device from unnecessarily re-downloading the file. The payload of the News file contains the following data elements:

| Symbol | symbol |
|---|---|
| Stock Description | |
| Chunk ID | char |
| Size | uint32 |
| Description | utf8.16 |
| Headlines | |
| Chunk ID | char4 |
| Size | uint32 |
| Count | uint16 |
| <ArrayOfHeadlines> | |
| Timestamp | uint32 |
| Headline | utf8.8 |
| Attribution | utf8.8 |
| URL | utf8.8 |
| </ArrayOfHeadlines> | |
| StockTwits | |
| Chunk ID | char4 |
| Size | uint32 |
| Count | uint16 |
| <ArrayOfTweets> | |
| Timestamp | uint32 |
| Headline | utf8.8 |
| Username | utf8.8 |
| URL | utf8.8 |
| </ArrayOfTweets> | |

In the News file for each stock, Symbol is the encoded symbol for the stock. Next is are Stock Description data values, including Chunk ID, which indicates the chunk type, Size, the number of bytes in this chunk (not including Chunk ID and Size), and Description, which is the description of this stock. Next are data values for headlines, including Chunk ID, the chunk type, Size, the number of bytes in this chunk (not including Chunk ID and Size), and Count, the number of headlines contained in chunk. Next is an array of headlines, where each array element includes Timestamp, the date and time for this headline in Unix time, Headline, the actual headline, Attribution, the source of the headline, and URL, the URL of the story on the web. Next is data regarding stock twits, including Chunk ID, the chunk type, Size, the number of bytes in this chunk (not including Chunk ID and Size), and Count, the Number of tweets contained in the chunk. Following this is an array of tweets, where each array element includes Timestamp, the date and time for this tweet in unix time, Headline, the actual tweet, Username, the Username of the Tweeter, and URL, the URL of the tweet.

As will be seen by a review of the data types of each data element in the data files, the data files created by a statistical data server (e.g., financial data server 1530) contain data in binary format and therefore convey the same information as XML files and graphics files, but in a significantly reduced size.

Reversibly-Encoded Stock Symbols

Figure 18:
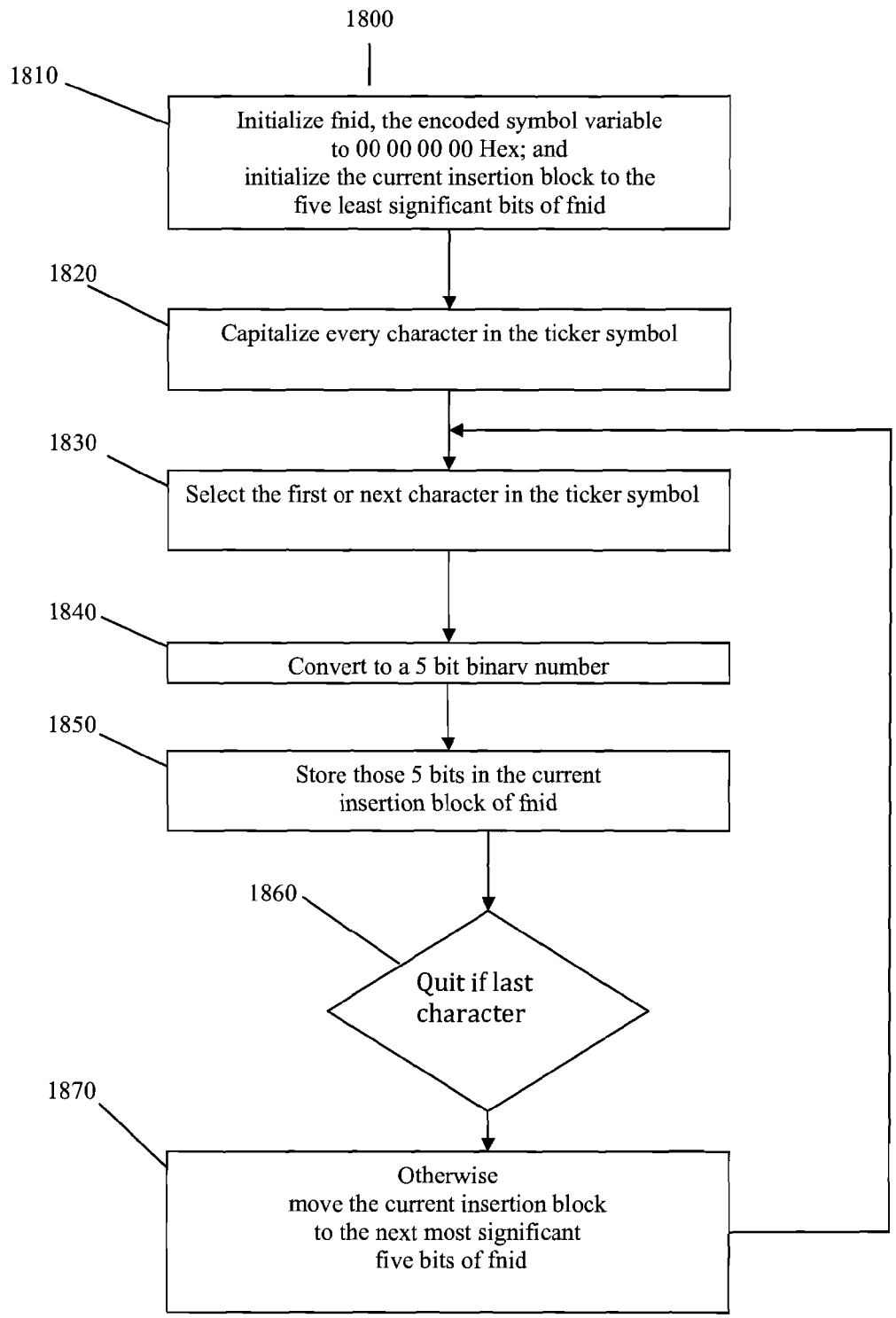
FIG. 18 is a flow chart showing the steps of an embodiment of a method encoding a stock ticker symbol.

In an embodiment, the ticker symbol for each stock is encoded to enhance efficiency and performance. FIG. 18 is a flow chart showing the steps of an embodiment of a method 1800 of encoding a symbol comprising a plurality of ASCII text characters (e.g., a stock ticker symbol) into a binary number. The method assumes that the stock ticker symbol includes only alphabetic characters "A"-"Z," "." and "-".

The iterations of the method build an encoded symbol value fnid, which is a four-byte, big-endian, binary number. There are 32 total bits in fnid, and these 32 bits provide 6 different blocks of 5 bits each. In an embodiment, the ticker symbol is encoded by deriving a 5-bit value for each character in the ticker symbol and storing the derived value in a different block in fnid. In step 1810, fnid is initialized to 00 00 00 00 (hex), and the current insertion point is initialized to the five least significant bits in fnid. In step 1820, every alphabetic character in the ticker symbol is capitalized. In step 1830, the next character in the ticker symbol is selected. If this is the first time through the method, the first character is selected. For example, if the ticker symbol is "IBM", the first character is "I".

In step 1840, the selected character is encoded as a binary number with five bits. A "[" character is substituted for a "-" and a "]" character is substituted for a ".". The number 64 (decimal) is then subtracted from the UTF8 numeric value of the character. Because the UTF8 numeric values for the characters "A"-"Z", "[," and "]" range from 65 (decimal) for "A" to 93 (decimal) for "]," subtracting 64 from the UTF8 decimal value yields a decimal number between 1 and 29 for each character in a proper stock ticker symbol. Since five binary bits can represent any decimal number from 0 to 31, this yields a unique five-bit encoding for the selected character. Returning to the ticker symbol "IBM": the decimal UTF8 value for "I" is 73, subtracting 64 yields 9, which is encoded as 01001; the decimal UTF8 value for "B" is 66, subtracting 64 yields 2, which is encoded as 00010; and the decimal UTF8 value for "M" is 77 subtracting 64 yields 13 which is encoded as 01101.

In step 1850, the encoded value for the character is stored in the current insertion point in fnid. In the first pass, the current insertion block is the five least significant bits of fnid. Thus, for the character "I" in IBM, the value of fnid after the first pass 1850 is:

encoded "I": 0000 0000 0000 0000 0000 0000 0000<u>1001</u>

In step 1860, the method quits if there are no more characters. If there is another character, in step 1870 the current insertion point is moved to the next most significant 5 bits in fnid and steps 1830-1870 are repeated until there are no more characters in the ticker symbol.

Continuing with the ticker symbol IBM, the next character is "B." After step 1840, the character "B" is encoded as 00010 (binary), and these five bits are stored in the current insertion point. After the insertion of the five bit value corresponding to "B" in step 1850, fnid looks like this:

encoded "IB": 0000 0000 0000 0000 0000 00<u>000 100</u> 1001

Continuing with the ticker symbol IBM, the next character is M. After step 1840, the character "M" is encoded as 01101 (binary), and these five bits are stored in the current insertion point, and the current insertion point is moved to the next five most significant bits. After the insertion of the encoded value of "M" in step 1850, fnid looks like this:

Encoded "IBM": 0000 0000 0000 0000 00<u>11 0100</u> 0100 1001

After the addition of the value corresponding to the "M" in IBM, the ticker symbol IBM has been encoded into the unique binary number 0000 0000 0000 0000 0011 0100 0100

1001, or 00 00 34 49 (hex). This encoding is reversible, meaning that the original ticker symbol can be recovered from the encoded value by reversing the steps of method 1800.

In an alternative embodiment, the reversible encoding method described above can be modified to encode stock ticker symbols (or other market unit symbols) that use numeric characters or a combination of alphabetic and numeric characters, such as are used in some Asian markets. In method 1800 as described above, the most significant 2 bits are not used and remained unchanged through the encoding process. These two bits can be set to identify whether the stock ticker symbols in the application user only alphabetic characters (00 binary), only numeric characters (01 binary), or an alphanumeric characters (10 binary).

Method 1800 can be modified as follows to encode stock ticker symbols that use only numeric characters 0-9 to identify stocks. In such a system, only 4 bits are needed to encode each number character. Step 1810 is modified to initialize fnid to 40 00 00 00 (hex), which reflects that the two most significant bits are 01 binary. Also, the first insertion block in fnid is initialized to the least significant 4 bits. Step 1820 is unnecessary. Step 1840 is modified so that each numeric character is encoded in 4 bits. The UTF8 values for "0"-"9" are 48-57 (decimal), and each numeric character can be normalized to a number between 0-10 (decimal) by subtracting 48; and any number between 0-10 (decimal) can be encoded in four binary bits. Step 1850 is modified so that the 4 bits of the encoded character are stored at the first insertion point, and step 1870 is modified to move the current insertion point to the next most significant four bits of fnid. In this manner any stock symbol composed of six numeric characters can be encoded.

Method 1800 can be modified as follows to encode stock ticker symbols that use a combination of alphabetic and numeric characters in stock ticker symbols. In such a system, 6 bits suffice to encode each character. Step 1810 is modified to initialize fnid to 80 00 00 00 (hex), which reflects that the two most significant bits are 10 binary. Also, the first insertion block in fnid is initialized to the least significant 6 bits. Step 1840 is modified so that each alphanumeric character is encoded in 6 bits. The UTF8 values for "0"-"9," "A"-"Z" and "]" range from 48-93 (decimal), and each character can be normalized to a number between 0-45 (decimal) by subtracting 48; and any number between 0-45 (decimal) can be encoded in 6 binary bits. Other alphanumeric characters (such as "-" and ".") are handled by substitution as in method 1800. Step 1850 is modified so that the 6 bits of the encoded character are stored at the first insertion point, and step 1870 is modified to move the current insertion point to the next most significant 6 bits of fnid. In this manner any stock symbol composed of up to 5 alphanumeric characters can be encoded.

Use of the reversible encoded number has several advantages over use of the alphabetic ticker symbol. The binary number can be used an index into a database, such as database 1538 described above with reference to FIG. 15. The binary number uses fewer bytes than most stock ticker symbols, making it more efficient to transmit files containing data relating to hundreds of stocks. Moreover, search and comparison operations are faster because processors require less time to compare to integers than to compare strings of alphanumeric characters.

Pulling Updated Statistical Data

When the user initiates an embodiment of the data visualization tool or application on their device, the client display device determines which files are required to visually display the information and requests those files from the server. For example, the first time the user initiates the application, the client display device determines that it needs all three types of files and requests those from the server. By further example, if the user initiates the application for the first time since the previous day, the client display device determines that it only requires "today" and "now" files and requests those from the server. During further operation, the client display device may request "now" files according to the required updating frequency of the application, which may be user-configurable. If the user selects a single stock display, such as shown in FIGS. 4 and 8, the client display device requests the corresponding individual stock files from the server. The server responds with the requested information, including the multiple time series charts described above.

In an embodiment, the client display device uses HTTP requests to pull files from the distribution server. The HTTP header If-Modified-Since can be used to keep the client display device from unnecessarily re-downloading files that have not been modified. The user can force the client display device to attempt to pull files from the distribution server by manually "refreshing" the display. In another embodiment, some client display devices allow a user to switch an application between active and dormant status, and the client display device will check for updates automatically whenever it has been dormant and is restored to active display status. For example, a user who is using the application on an iPhone may interrupt viewing statistical data to take a phone call and to check email. During the phone call and the email checking, the activity map application is not active on the display screen. When the user again selects the activity map application and returns it to active display, the client display device will automatically attempt to pill updated statistical data. In an alternative embodiment, a client display device can be configured to automatically check for updates at selected times or selected intervals.

Rendering

Once the application receives the necessary encoded data files from the server via the client, it translates files into the various user-interface displays as described above with references to FIGS. 1 through 14. In particular, the application generates from the files a set of dynamic comparison matrices, with each element corresponding to an icon in the display corresponding to an individual stock. In an embodiment, each icon is a rectangular tile of substantially the same shape and size. However, the scope of the invention does not depend on the specific size or shape of the icon. In an embodiment, some display parameters, such as size and shape, are the same for each icon, and other display parameters, such as the base color and shade of each tile, and the color and shade of the symbols on each tile, differ for each token based on a the current value of dynamic data.

The user can configure which type of dynamic data affects the variable display parameters. The application sets each tile's color and/or visual mode (or display parameters) based on user configurable parameters. For example, when the user selects "Price" mode, the application may select the tile color arrays based on the deviation between the most recent price information and the reference value, and the color of each tile may differ depending on the size of the deviation. If the user selected "1D" on the user interface sidebar, the application will set the color of each individual tile based on a comparison between the current price and the yesterday's closing price. The tile colors also may be user-configurable such as by a "Preferences" menu. For example, instead of the red/green colorization scheme for price changes, a user could choose a yellow/purple scheme. Furthermore, a user could select a colorization range and scale for the tiles rather than having these parameters fixed by the application itself. For example, if a user wanted to look more closely at big movers, the user could define that tiles for all stocks with price changes less than 50% are black while tiles for stocks changing +50% and −50% would be colored bright green and bright red, respectively. Many other user-selectable color variations are possible. For example, other display parameters can be used to illustrate different values of dynamic data elements, including, by way of example, color, tint, hue, brightness, shading, 2-D shape, 3-D shape, hatching, stippling, highlighting, backlighting, contrast, and each of these design parameters can be applied to the icon and/or to the symbols displayed on the icon. For example, the stocks with the most-extreme changes in price for a period may have the symbols displayed on each tile in bright white, whereas other icons may have symbols on each tile displayed in gray. Display parameters may also be varied when a stock has been identified as a favorite.

Once the application determines the colors for each tile, it charts the tiles using mathematical optimization techniques. These techniques improve the rendering speed of the visualization, making the application appear more responsive to the user. In addition, the application may take advantage of any high performance graphics rendering capabilities available in the device. Some devices, including devices using operating systems such as Apple's iOS and Google's Android, may include the OpenGL ES application programming interface (API) that enables 2D and 3D graphics on embedded systems. The OpenGL ES API allows the application developer to access low-level graphics acceleration hardware available in the device hardware, which results in a more attractive and responsive user interface.

Figure 22:
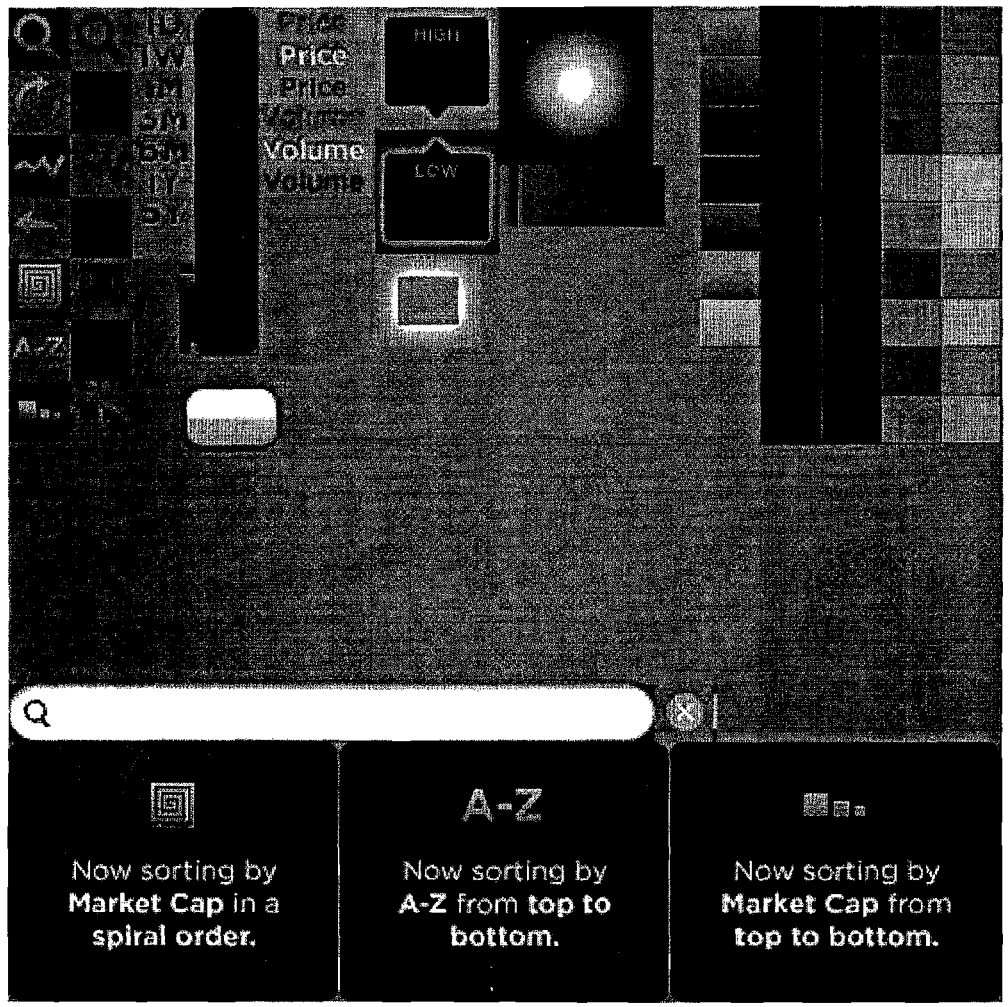
FIG. 22 is an exemplary collection of texture mapping elements used by a display device to render a display of statistical data, according embodiments of the present disclosure.

For example, some embodiments may use Vertex Buffer Objects (VBOs) and texture mapping to achieve fast rendering of the level-1 screen that displays a large number of tiles representing the entire population of items for which statistical data can be visualized. Such embodiments also may use VBOs and/or texture mapping to achieve 30 frames-per-second animation in transitions between the displays for different levels. In one embodiment, VBOs and texture mapping may be used to render the population of 900 tiles shown in each of FIGS. 1-3. A VBO is an Open GL feature that provides methods for uploading data to the renderer for non-immediate-mode rendering. VBOs offer substantial performance gains over immediate mode rendering primarily because the data resides in the renderer memory rather than display device's system memory, and as such can be rendered directly by the renderer. Similarly, texture mapping is an Open GL technique used to surface detail or texture to a shape, such as the rectangular tiles shown in FIGS. 1-3. Texture mapping is akin to applying patterned paper to a plain white box. FIG. 22 shows an exemplary set of texture mapping elements used to render level-1, level-2, and level-3 displays.

Exemplary Methods of Operation

Figure 11:
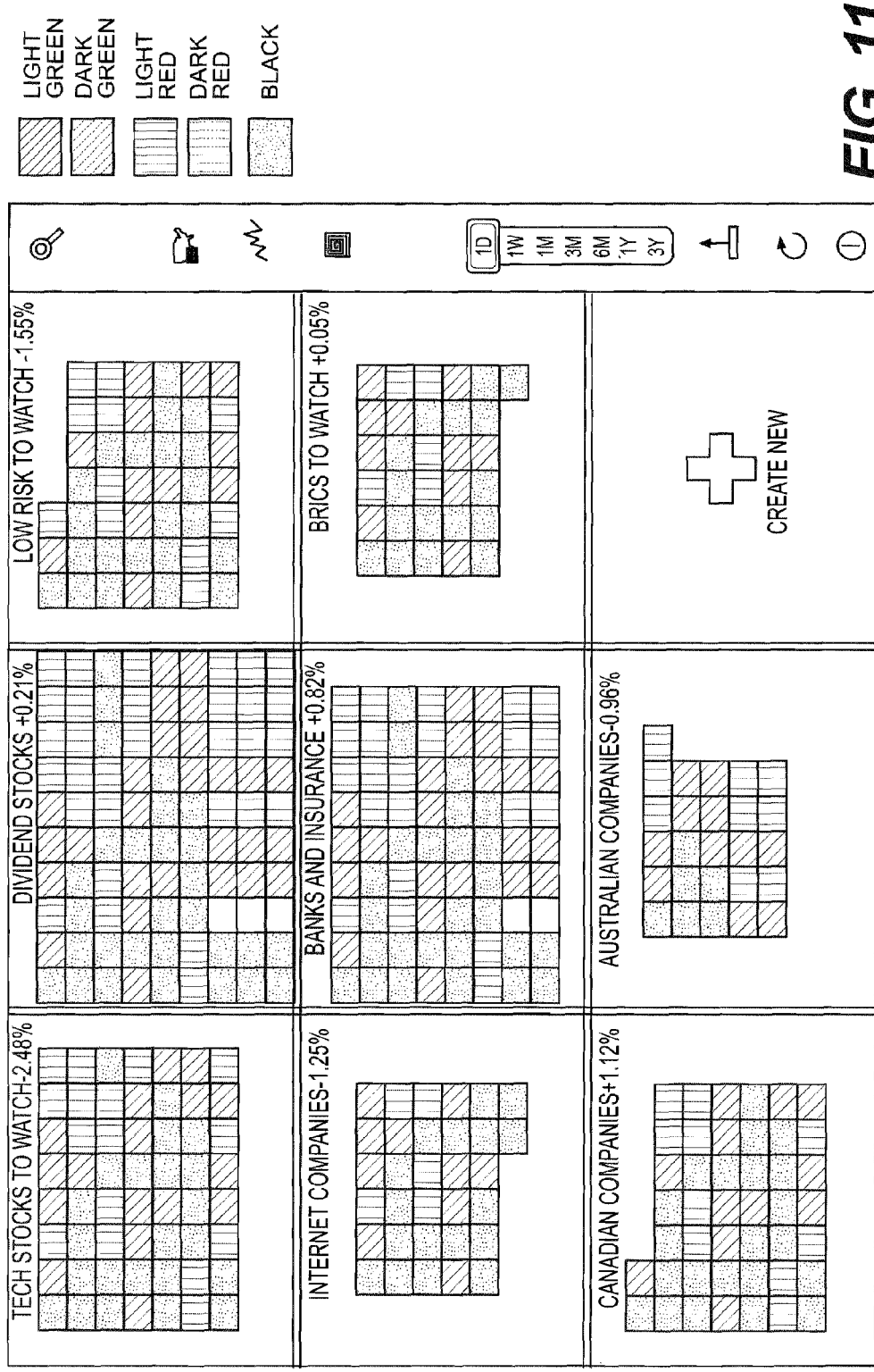
FIG. 11 is a view of a display in an embodiment, showing customized sectors.
Figure 12:
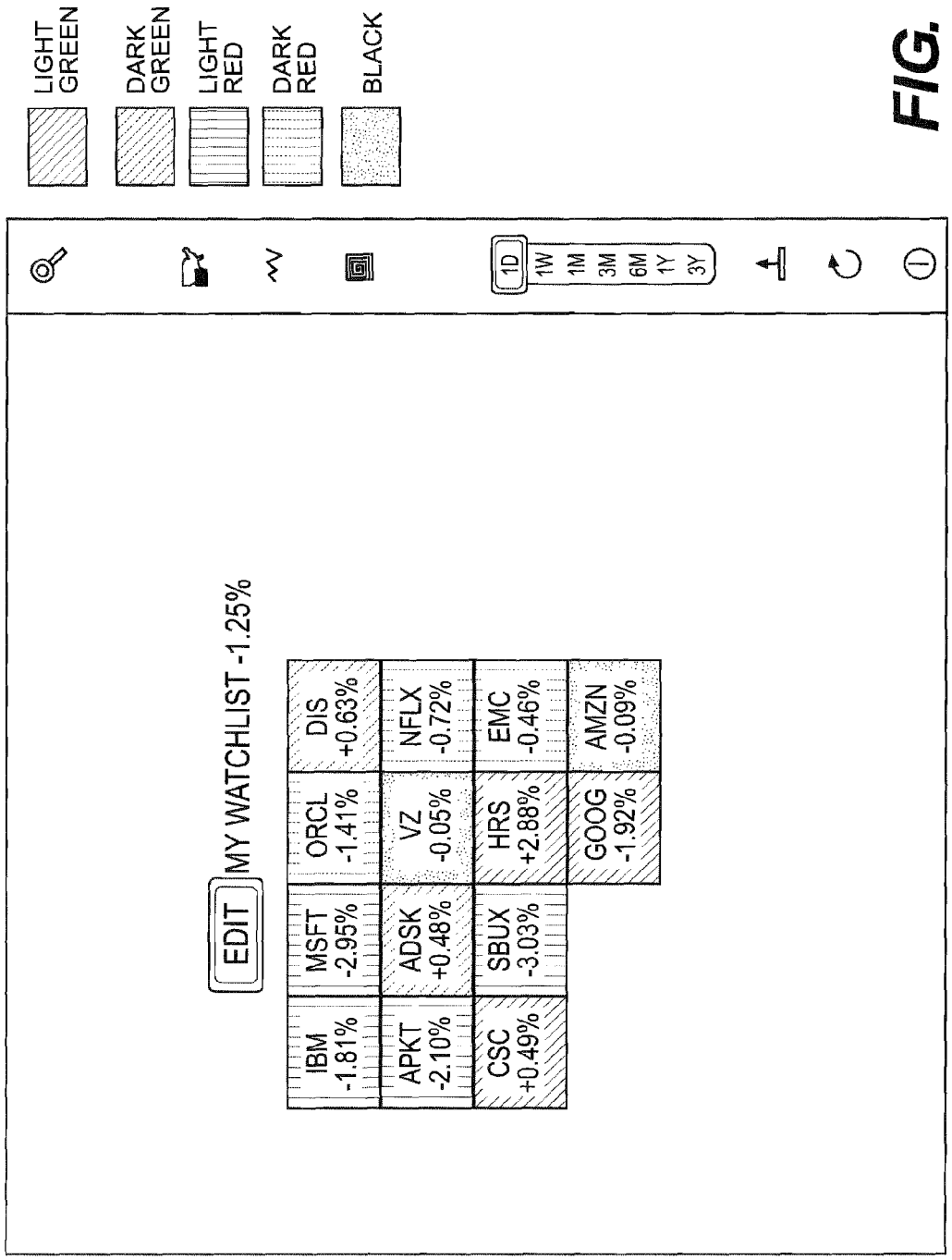
FIG. 12 is a view of a display in an embodiment, showing a zoomed-in view of stocks in a customized sector.
Figure 19:
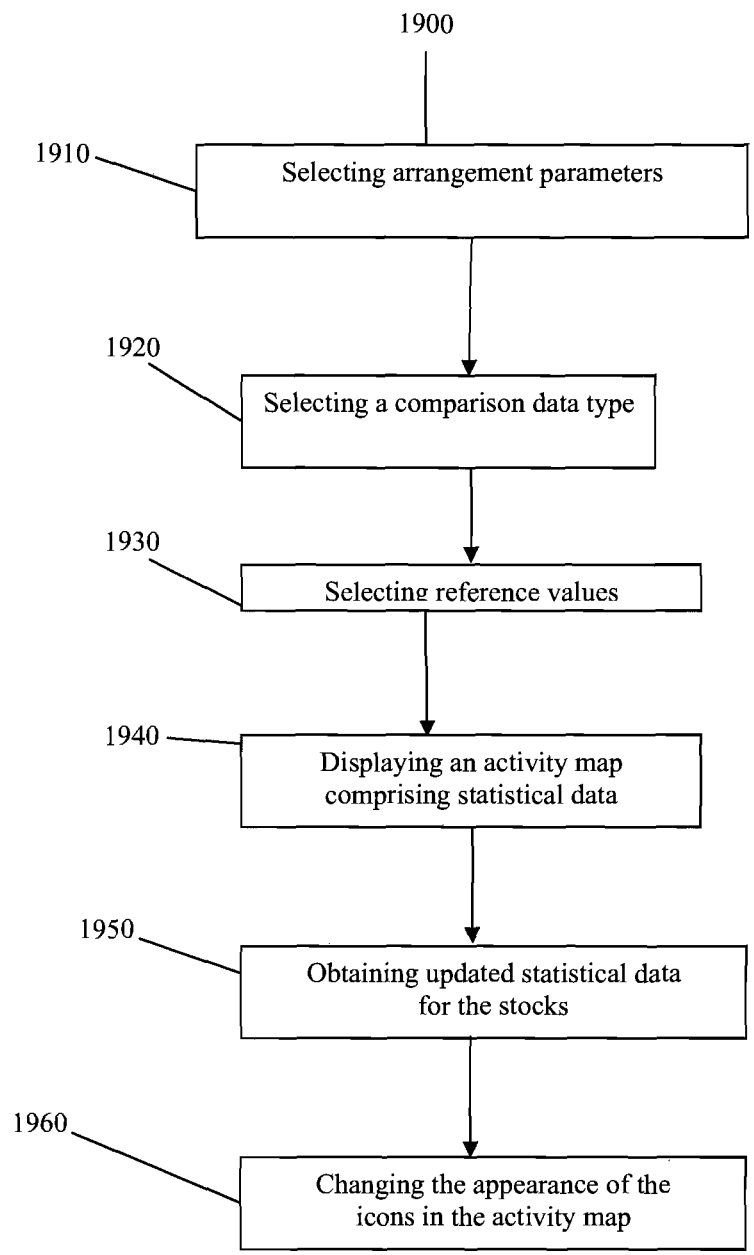
FIG. 19 is a flow chart showing steps of an embodiment of a method of displaying statistical data.

FIG. 19 is a flow chart that shows steps of an exemplary embodiment of a method 1900 of displaying statistical data, e.g., financial data. In step 1910, arrangement parameters are selected. For example, how icons are to be arranged with a sector (spiral, alphabetical, winners and losers, etc.) can be selected. In an embodiment, the user can customize the items viewed in each sector and/or can create custom sectors and watch lists. FIG. 11 illustrates an exemplary display of customized sectors, and FIG. 12 illustrates a level 2 display of a watchlist.

Figure 10:
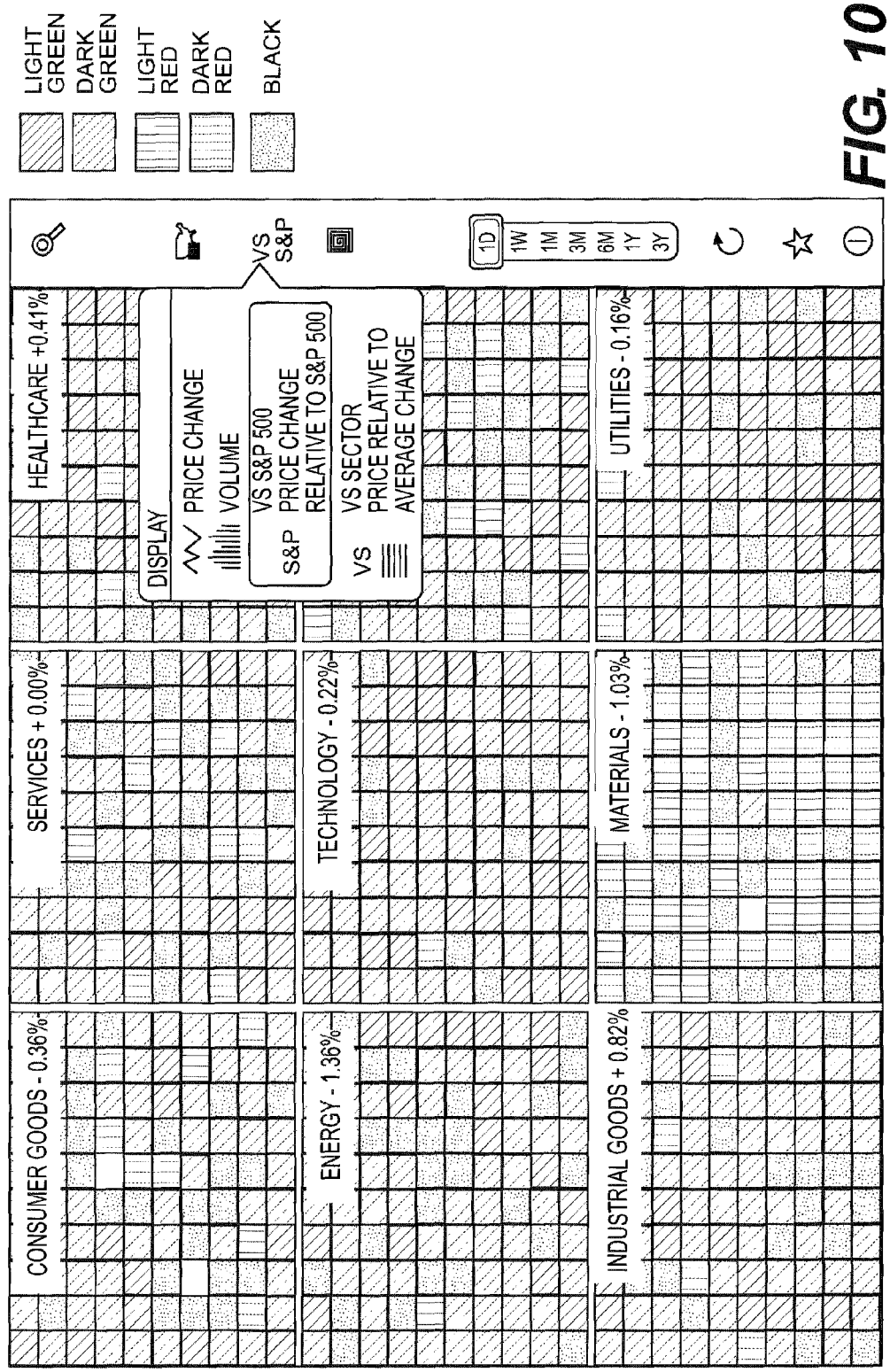
FIG. 10 is a view of a display in an embodiment, showing selection of a type of data to be displayed.

In step 1920, a comparison data type, such as price or volume, is selected. In step 1930, reference values are selected. The reference values, in an embodiment, can include the value of the comparison date type at a historical reference point, for example, yesterday, or one year ago, and comparisons to other reference values, such as, for example, a comparison of the price of a stock to an index such as the S&P 500, or a comparison of the stock price to average price change in the sector. FIG. 10 illustrates a right menu option that allows the user to select comparison data types and reference values.

In step 1940, an activity map comprising statistical data is displayed. In the manner described herein, each icon is displayed in a particular color, or color shade, to indicate the relationship between the corresponding item's reference data comparison data type (e.g., price, volume) and that of the reference value (e.g., time period, index, sector). In step 1950, updated statistical data for the items (e.g., performance and/or risk data for stocks) is obtained. As described above, the user may manually request a refresh, or the data may be automatically refreshed, for example, when the application is returned to active status. And in step 1960, the appearance of the icons in the activity map is changed. If, the comparison data value of an item has changed in relation to the reference value, the appearance of the icon corresponding to the item is changed, and the icon display is refreshed. Embodiments of method 1900 are not limited to the order in which the steps are shown; the steps can occur in any order.

Figure 20:
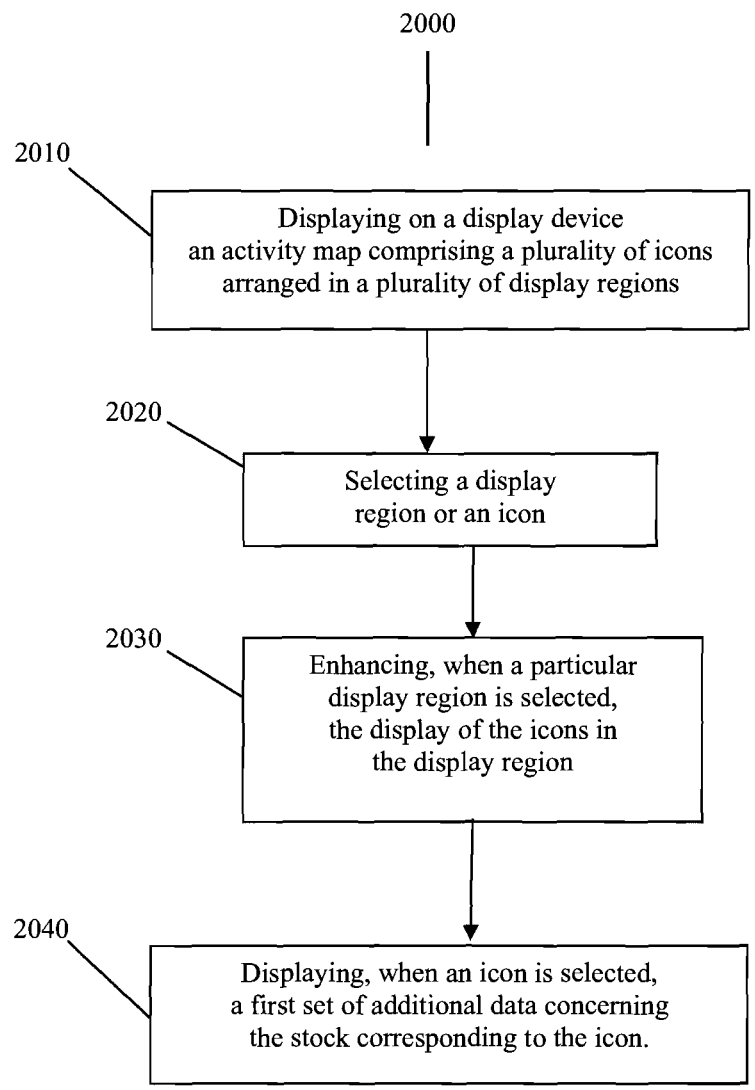
FIG. 20 is a flow chart showing steps of an embodiment of a method for navigating a display of statistical data.

FIG. 20 is a flow chart showing steps of an exemplary embodiment of a method 2000 for navigating a display of statistical data, e.g., financial data. In step 2010, an activity map comprising a plurality of icons arranged in a plurality of display regions is displayed. The activity map, in the exemplary embodiment, includes 9 display regions displayed in a square pattern, and each display region includes 100 tile icons representing 100 different items, such as stocks. Each icon has display parameters (for example, size and shape), that are the same for each icon, and a variable display parameter, for example, color. In step 2020, a display region or an icon is selected. Exemplary methods of selection, in an embodiment, include touching, swiping, and pinching on a touch-screen display, and searching. If a display region is selected, in step 2030 the display of the icons in the selected display region is enhanced. For example, selection of a sector in a level 1 display (by, for example, touching the display region corresponding the selection) cause a level 2 display of the sector in which the display region for the sector is enlarged to fill the entire screen formerly filled by the level 1 display. If an icon is selected, in step 2040 additional data concerning the stock corresponding to the icon is displayed in a level 3 display. A level 3 display may include a time series graph for the specified period for the selected item and news or identifying information related to the item. A level 3 display may be contained on a single display screen or multiple display screens, which can be navigated, in an embodiment, by touching. Embodiments of method 2000 are not limited to the order in which the steps are shown; the steps can occur in any order.

Figure 21:
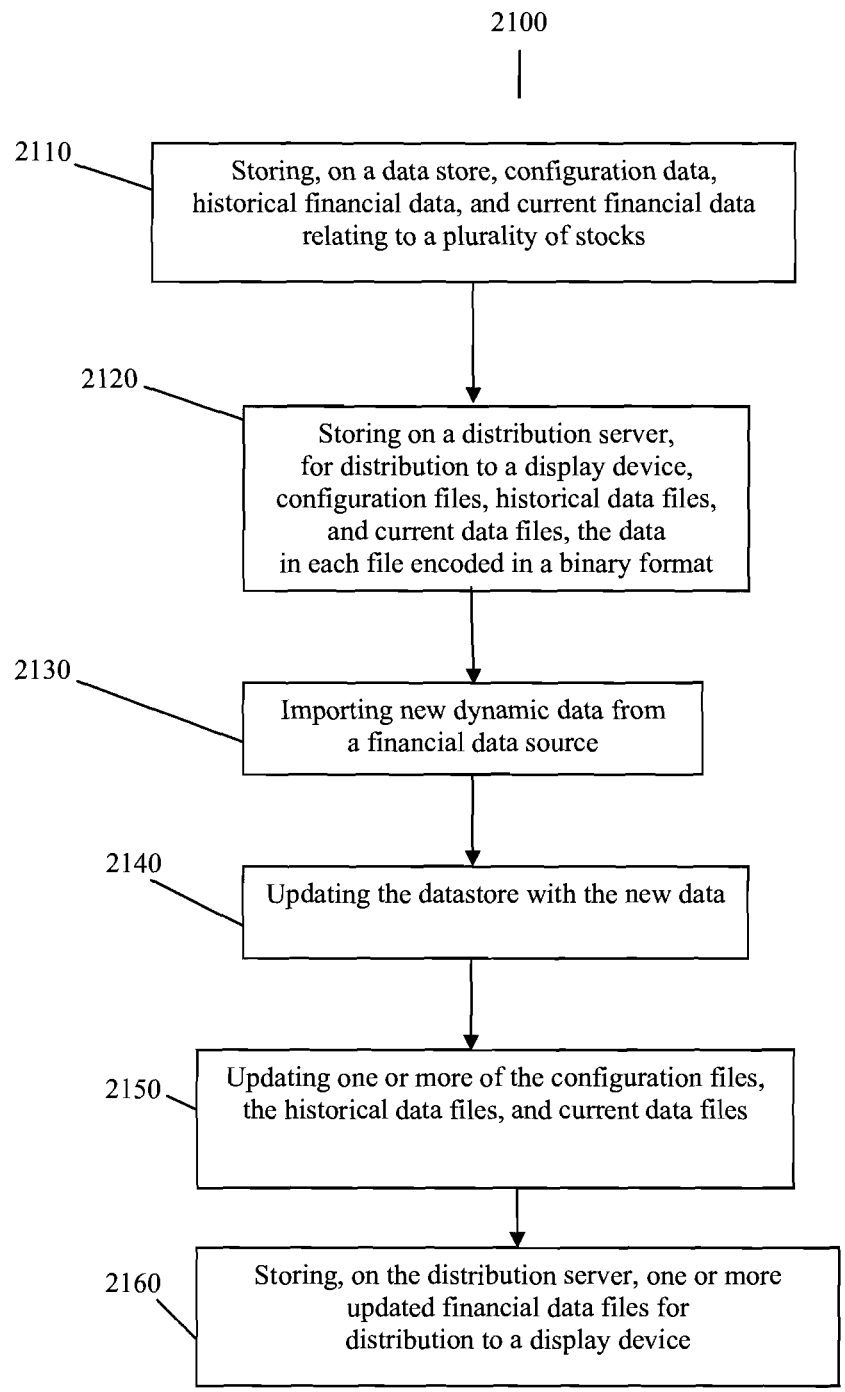
FIG. 21 is a flow chart showing the steps of an embodiment of a method of distributing statistical data.

FIG. 21 is a flow chart showing the steps of an exemplary embodiment of a method 2100 of distributing statistical data, e.g., financial data. The method 2100 is used in connection with a statistical data delivery system, such as the exemplary financial embodiment described above with reference to FIG. 15, comprising a financial data source, a financial data server, a data store, a distribution server, and a display device coupled to the distribution server via a communications network. In step 2110, configuration data, historical financial data and current financial data related to a plurality of items (e.g., stocks) are stored on a data store. In an embodiment, the financial data server imports financial data from one or more financial data sources and stores it in the data store. In step 2120, configuration files, historical data files, and current data files are stored on a distribution server for distribution to a display device. In an embodiment, financial data server 1530 processes and packages financial data from the data store to create the configuration files, historical data files and current data files using a binary data format. Each of these files is stored on the distribution server from which the files can be distributed to a display device. In step 2130, new dynamic data is imported from one of the financial data sources, and in step 2140, the data store is updated with the new data. In step 2150, the configuration files, historical data files and current data files are updated with the new data. In an embodiment the financial data server analyzes the new data and determines whether any of the configuration files, historical data files or current files need to be updated, and if so, new data files are created. And in step 2160, the updated files are stored on the distribution server for distribution to a display device. Embodiments of method 2100 are not limited to the order in which the steps are shown; the steps can occur in any order.

Exemplary Hardware and Software Components

Figure 16A:
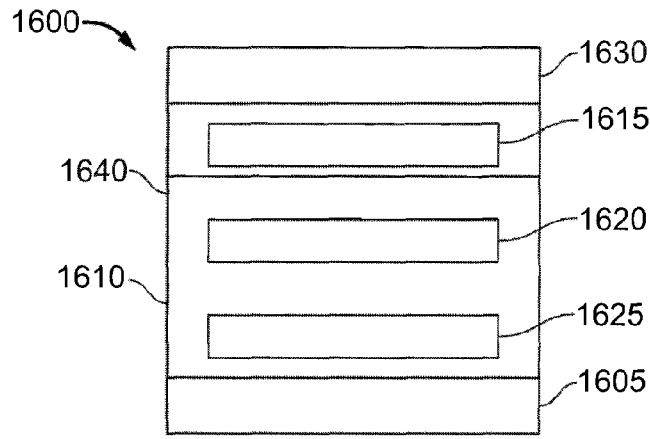
FIGS. 16A and 16B are block diagrams of the software and hardware components of a server according to one or more embodiments of the present disclosure.
Figure 16B:
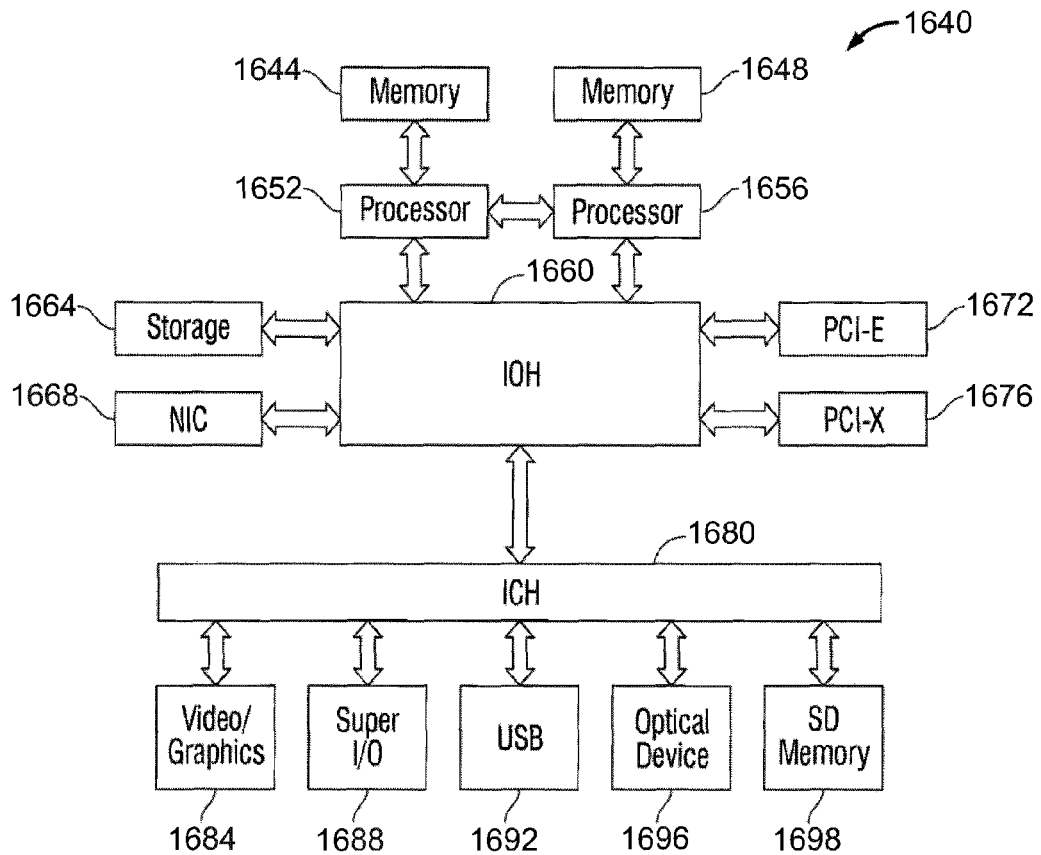
Figure 17:
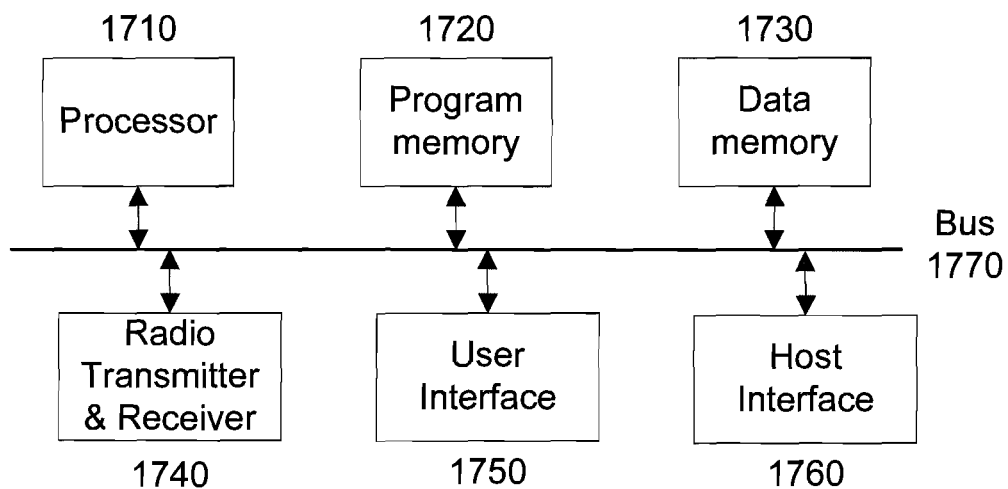
FIG. 17 is a block diagram of a display device for use in an embodiment of a statistical data delivery system.

FIG. 16B depicts an exemplary computer 1640 for hosting a server, for example, a distribution server or financial data server in an embodiment. Exemplary computer 1640 employs an architecture comprising one or more processing units 1652, 1656. Embodiments with more than one processing unit may include parallel processors. Processing units 1652, 1656 may contain one or more processors and/or multiple cores and may be implemented using one or more heterogeneous processor systems. Processors 1652, 1656 are coupled to memory 1644, 1648. Memory 1644, 1648 preferably comprises random access memory, including, preferably, a multiple-level memory cache hierarchy. Processors 1652, 1656 preferably are coupled to Input/Output Hub 1660. Input/Output Hub 1660 preferably is coupled to one or more peripheral busses, including PCI-E bus 1672 and PCI Express bus 1676. Input/Output Hub 1660 preferably is coupled to network interface controller 1668 for coupling to a communications network. Input/Output Hub 1660 preferably is also coupled to one or more storage units 1664, including one or more hard disks, RAID arrays or Serial Attached SCSI (SAS) units. Input/Output Hub 1660 preferably is coupled to I/O Controller Hub 1680. I/O Controller Hub 1680 preferably is coupled to video/graphics chipset 1684, Super I/O (SIO) device 1688, Universal Serial Bus (USB) Controller 1692, optical drive 1696, and a slot for SD memory 1698. One or more components may be coupled to I/O Controller Hub 1680 via a PCI bus, an integrated drive electronics (IDE), or a serial advanced technology attachment (SATA) interface. Of course, the coupling between the components of computer 1640 may be implemented using any type of communications fabric or architecture that provides for a transfer of data between different components or devices attached to the fabric or architecture.

Generally, computer 1640 can be any computer embodied in hardware that provides sufficient computing power, memory, and persistent storage to perform the methods and processes and techniques of the embodiments described herein. An exemplary computer for use with embodiments described herein is a Hewlett Packard Proliant® G6 server with dual cores and hyperthreading.

Those of skill will recognize that the methods, processes, and techniques of the embodiments described herein may be implemented to advantage in a variety of sequential orders and that embodiments may be generally implemented in a physical medium, preferably magnetic or optical media such as RAM, RAM drives, USB drives, SD memory, disks, tapes, DVDs and CD-ROMs or other storage media, for introduction into a directory service configured to synchronize changes described herein. In such cases, the media will contain program instructions embedded in the media that, when executed by one or more processing units, will execute the steps and perform the methods, processes, and techniques described herein including processing, importing, publishing and distributing statistical data.

FIG. 16A depicts exemplary software components 1600 of a computer 1640 (FIG. 16B) in an exemplary embodiment. Memory 1630 in FIG. 16A preferably comprises memory 1644, 1648. An operating system 1605 is executed by processing units 1652, 1656. The operating system 1605 coordinates and provides control of various components within computer 1640 in FIG. 16B. Exemplary operating systems 1605 include commercially available operating systems such as Solaris® (Solaris is a trademark of Oracle America, Inc. in the United States and other countries) or Linux® (Linux is a trademark of Linus Torvalds in the United States and other countries). An object oriented programming system, such as the Java programming system, may be implemented in a Java Virtual Machine (not illustrated) executing in conjunction with the operating system 1605 (Java is a trademark of Oracle America, Inc., in the United States and other countries). Software components 1600 in a computer used in an exemplary embodiment of a statistical data delivery system may include server software 1610 including code and instructions for performing the methods, processes and techniques of financial data server 1530 (from FIG. 15), including software components 1620 for performing the methods, processes and techniques of Importer 1532 (from FIG. 15), and software components 1625, for performing the methods, processes and techniques of Publisher 1535 (from FIG. 15). In addition, software components 1600 in a computer used in an exemplary embodiment of a statistical data delivery system may include server software 1615 including code and instructions for performing the methods, processes and techniques of distribution server 1580 (from FIG. 15). In addition, software components 1600 in a computer used in an exemplary embodiment of a statistical data delivery system may include data store software 1630 for implementing data store 1538 (from FIG. 15). In an embodiment, server software components 1615, 1620 and 1625 may be hosted on the same server computer, or plurality of server computers. In an embodiment, each server software component is preferably implemented as a Java application and executed as an independent process in a Java Virtual Machine (not illustrated). In an alternative embodiment, server software components 1615, 1620, and 1625 may each be hosted on a server computer, or different plurality of server computers.

Data and instructions for the operating system 1605, the object oriented programming system, and applications or programs are located on storage devices, such as HD/SAS units 1664, and may be loaded into main memory 1644, 1648 for execution by processing units 1652, 1656. Java Applications may contain instructions that are loaded into the portion of memory 1644, 1648 containing a Java Virtual Machine (not illustrated) and executed by the Java Virtual Machine. The methods and processes of the illustrative embodiments described herein may be performed by processing units 1652, 1656 using computer implemented instructions, which may be located in a memory, such as, for example, memory 1644, 1648, SD memory 1698, or in one or more peripheral devices.

The exemplary embodiments shown in FIGS. 16A and 16B and described above are not meant to imply architectural limitations. The exemplary hardware shown in FIG. 16B may vary depending on the implementation. Other internal hardware or peripheral devices, such as flash memory, equivalent non-volatile memory, and the like, may be used in addition to or in place of the hardware depicted in FIG. 16B. In addition, the processes of the illustrative embodiments may be applied to a multiprocessor data processing system. In addition, the processes of the illustrative embodiments may be encoded in a programming platform other than Java, and may be executed under an operating system other than Linux or Solaris.

FIG. 19 is a block diagram of exemplary display device or apparatus utilizing certain embodiments of the present disclosure, including one or more of the methods described above with reference to the figures. Device 1900 comprises processor 1910 that is operably connected to program memory 1920 and data memory 1930 via bus 1970, which may comprise parallel address and data buses, serial ports, or other methods and/or structures known to those of ordinary skill in the art. Program memory 1920 comprises software code executed by processor 1910 that enables device 1900 to communicate using one or more wired or wireless communication protocols, including one or more wireless communication protocols standardized by 3GPP, 3GPP2, or IEEE, such as those commonly known as LTE, UMTS, HSPA, GSM, GPRS, EDGE, 1xRTT, CDMA2000, 802.11, WiFi, HDMI, USB, etc., or any other protocols utilized in conjunction with radio transceiver 1940, user interface 1950, and/or host interface 1960. Program memory 1920 further comprises software code executed by processor 1910 to control the functions of device 1900, including configuring and controlling various components such as radio transceiver 1940, user interface 1950, and/or host interface 1960. Such software code may be specified or written using any known or future developed programming language, such as e.g. Java, C++, C, and Assembler, as long as the desired functionality, e.g., as defined by the implemented method steps, is preserved.

Data memory 1930 may comprise memory area for processor 1910 to store variables used in protocols, configuration, control, and other functions of device 1900. As such, program memory 1920 and data memory 1930 may comprise non-volatile memory (e.g., flash memory), volatile memory (e.g., static or dynamic RAM), or a combination thereof. Furthermore, data memory 1930 may comprise a memory slot by which removable memory cards in one or more formats (e.g., SD Card, Memory Stick, Compact Flash) may be inserted and removed. Persons of ordinary skill in the art will recognize that processor 1910 may comprise multiple individual processors (not shown), each of which implements a portion of the functionality described above. In such case, multiple individual processors may be commonly connected to program memory 1920 and data memory 1930 or individually connected to multiple individual program memories and or data memories. More generally, persons of ordinary skill in the art will recognize that various protocols and other functions of device 1900 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio transceiver 1940 may comprise radio-frequency transmitter and/or receiver functionality that enables device 1900 to communicate with other equipment supporting like wireless communication standards. In an exemplary embodiment, radio transceiver 1940 includes an LTE transmitter and receiver that enable device 1900 to communicate with various Long Term Evolution (LTE) networks (also known as "4G") according to standards promulgated by 3GPP. In some embodiments, radio transceiver 1940 includes circuitry, firmware, etc. necessary for device 1900 to communicate with various UMTS and/or GSM/EDGE networks, also according to 3GPP standards. In some embodiments, radio transceiver 1940 includes circuitry, firmware, etc. necessary for device 1900 to communicate with various CDMA2000 networks, according to 3GPP2 standards. In some embodiments, radio transceiver 1940 is capable of communicating using radio technologies that operate in unlicensed frequency bands, such as IEEE 802.11 WiFi that operates in the ISM bands in the regions of 2.4 and 5.6 GHz. In some embodiments, radio transceiver 1940 may comprise a transceiver that is capable of wired communication, such as by using IEEE 802.3 Ethernet technology. The functionality particular to each of these embodiments may be coupled with or controlled by other circuitry in device 1900, such as processor 1910 executing protocol program code stored in program memory 1920.

User interface 1950 may take various forms depending on the particular embodiment of device 1900. In some embodiments, device 1900 is a mobile phone, in which case user interface 1950 may comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In such mobile phone embodiments, the particular features comprising the device may depend on whether the device is a smartphone, feature phone, or other type of mobile phone. In other embodiments, device 1900 is a tablet computing device (such as an iPad® sold by Apple Inc.) comprising a touchscreen display that is much larger than touchscreen displays found on mobile phones. In such tablet embodiments, one or more of the mechanical features of user interface 1950 may be replace by comparable virtual user interface features (e.g., virtual keypad, virtual buttons, etc) implemented using the touchscreen display of device 1900, as familiar to persons of ordinary skill in the art. In other embodiments, device 1900 may be a digital computing device, such as a laptop computer, desktop computer, workstation, etc. that comprises a mechanical keyboard that may be integrated, detached, or detachable depending on the particular embodiment.

Host interface 1960 of device 1900 also may take various forms depending on the particular embodiment of device 1900. In embodiments where device 1900 is a mobile phone, host interface 1960 may comprise a USB interface, an HDMI interface, or the like. In some embodiments, device 1900 may comprise more functionality than is shown in FIG. 19. In some embodiments, device 1900 may also comprise functionality such as a video and/or still-image camera, media player, etc., and radio transceiver 1940 may include circuitry necessary to communicate using additional radio-frequency communication standards including Bluetooth, GPS, and/or others. Persons of ordinary skill in the art will recognize the above list of features and radio-frequency communication standards is merely exemplary and not limiting to the scope of the present disclosure. Accordingly, processor 1910 may execute software code stored in program memory 1920 to control such additional functionality.

Although embodiments of the present disclosure have been described in detail, it will be apparent to those skilled in the art that many embodiments taking a variety of specific forms and reflecting changes, substitutions and alterations can be made without departing from the spirit and scope of the embodiments. The described embodiments illustrate the scope of the claims but do not restrict the scope of the claims.

What is claimed is:

1. A method of displaying statistical data on a mobile computing device, comprising:
   displaying an activity map on a mobile computing device, communicatively coupled to one or more servers, wherein
      the activity map, requested by the mobile computing device from the one or more servers, comprises a plurality of icons of substantially similar size and shape,
      each icon corresponds to one of a plurality of items of a similar type, each one of the plurality of items is associated with one of a plurality of sectors or groups, and
      each icon is displayed on the display screen of the mobile computing device in a display region associated with said one of a plurality of sectors or groups, such that each icon displayed in a display region corresponds to one of the plurality of items associated with said sector or group,
      each icon is displayed in one or more of a plurality of display colors, wherein the display coloring for each icon relates to a statistical data value for the one of the plurality of items corresponding to the icon;
   updating the statistical data values for a portion of the plurality of items, wherein the statistical data values comprise dynamic and static data associated with the plurality of items corresponding to the icon and stored on the one or more servers; and
   changing the display coloring for icons in the activity map to reflect the updated value for the item corresponding to the icon being changed, including changing the coloring of content in the icon.

2. The method of claim 1 wherein an item represents at least one of a stock, bond, exchange traded fund, futures contract, currency, commodity, individuals or groups of individuals performing the same or a similar task or job, and elements or parts of one or more systems used for a particular purpose.

3. The method of claim 1 wherein each icon is a rectangular tile.

4. The method of claim 1 wherein there is a plurality of sectors or groups.

5. The method of claim 1 further comprising arranging the icons in display regions.

6. The method of claim 5 further comprising arranging the icons according to one of the following patterns: total number of items, with largest in center and spiraling outwards, top left to bottom right ordering based on total number of items, price change, activity, or alphabetical.

7. The method of claim 5 further comprising re-arranging the icons in a display region into a different pattern.

8. The method of claim 1 wherein updating the statistical data for a plurality of items further comprises pulling updated statistical data from a statistical data server.

9. The method of claim 8 further comprising pulling updated statistical data from the statistical data server when the activity map is restored to active display.

10. The method of claim 8 further comprising receiving a configuration file in a binary format from a statistical data server and modifying a display value of an icon.

11. The method of claim 8 further comprising receiving an updated current data file from a statistical data server and updating the display of one or more icons corresponding to updated values in the updated current data file.

12. The method of claim 8 further comprising receiving a updated historical data file in a binary format from a financial data server and updating the display of one or more icons corresponding to updated values in the updated historical file.

13. The method of claim 1 wherein the display coloring for each icon relates to a statistical data value which is based on a price differential between the current value of the corresponding item and one of the following: an index value, a value related to the sector of the corresponding item, a value of the corresponding item at the end of the most recent historical period, a value of the corresponding item over a selected historical period.

14. The method of claim 1 wherein the statistical value relates to:
   a current value of the corresponding item which is the volume of the corresponding item during a current period; and
   a value of the corresponding item over a selected historical period which is the volume of the corresponding item over a selected historical period or a value related to the volume over a selected historical period of the sector or group with which the corresponding item is associated.

15. The method of claim 1 wherein the mobile computing device comprises a touch screen display.

16. The method of claim 15 further comprising touching a display region to enhance the display of all items in the sector or group associated with the display region.

17. The method of claim 15 further comprising touching an icon to reveal additional detail about the item corresponding to the icon.

18. The method of claim 17 further comprising touching an icon to reveal time series data for one of the plurality of items.

19. The method of claim 15 wherein the activity map is a hierarchical activity map having levels, the method further comprising:
   reading a gesture; and
   changing a hierarchical level of the activity map to be displayed based on the read gesture.

20. The method of claim 19 wherein the read gesture is a pinch-out gesture and wherein the activity map hierarchical level to be displayed changes from a first level to a second level.

21. The method of claim 15 wherein alphanumeric data is displayed within icons, further comprising changing the alphanumeric data displayed within a plurality of the icons to reflect a change in the data.

22. The method of claim 21 wherein the alphanumeric data to be displayed changes periodically.

23. The method of claim 21 wherein the alphanumeric data to be displayed changes dynamically.

24. The method of claim 15 further comprising processing for display on the mobile computing device an animation wherein the animation represents the activity map including the plurality of icons.

25. The method of claim 24 wherein the animation is 30 frames per second.

* * * * *